United States Patent [19]
Kita et al.

[11] Patent Number: 4,910,607
[45] Date of Patent: Mar. 20, 1990

[54] IMAGE PROCESSING DEVICE OF MULTIFUNCTIONAL TYPE

[75] Inventors: Toshiro Kita, Nara; Susumu Genba, Kyoto; Masato Takemoto, Yamatokoriyama; Takashi Tatsumi, Osaka; Toshiyuki Itoga; Yutaka Iizuka, both of Yamatokoriyama; Satoshi Tominaga, Ikoma; Mikio Higashiyama, Higashiosaka; Akira Tanimoto, Kashihara; Shinji Okamoto, Yamatokoriyama; Toshihiko Yoshida, Nara, all of Japan

[73] Assignee: Sharp Kabushiki Kaisha

[21] Appl. No.: 102,606

[22] Filed: Sep. 30, 1987

[30] Foreign Application Priority Data
Sep. 30, 1986 [JP] Japan ................. 61-234077

[51] Int. Cl.⁴ .......................................... H04M 1/00
[52] U.S. Cl. .................................... 358/400; 358/448
[58] Field of Search ................ 358/280, 400, 401, 448

[56] References Cited
U.S. PATENT DOCUMENTS
4,494,149 1/1985 Furukawa .................... 358/257

Primary Examiner—Edward L. Coles, Sr.
Attorney, Agent, or Firm—Birch, Stewart, Kolasch & Birch

[57] ABSTRACT

An image processing device for controlling data transfer includes an image scanner, an image printer, a facsimile control unit, bus lines for data transfer, a bidirectional parallel interface unit, and a main CPU in a housing. The device is connected to an external data processing device through the parallel interface unit. In addition to the functions which are obtained independent from the external data processing device, the image processing device realizes various kinds of functions by controlling the image scanner, the image printer facsimile control unit and the interface unit by the main CPU in response to commands from the data processing device. As a result, various kinds of image processing functions are carried out.

5 Claims, 15 Drawing Sheets

| CODE | INPUT | OUTPUT |
|------|-------|--------|
| 40 | HOST | HOST |
| 41 | HOST | FAX |
| 42 | HOST | PTR |
| 43 | FAX | HOST |
| 44 | FAX | PTR |
| 45 | SCNR | HOST |
| 46 | SCNR | FAX |
| 47 | SCNR | PTR |

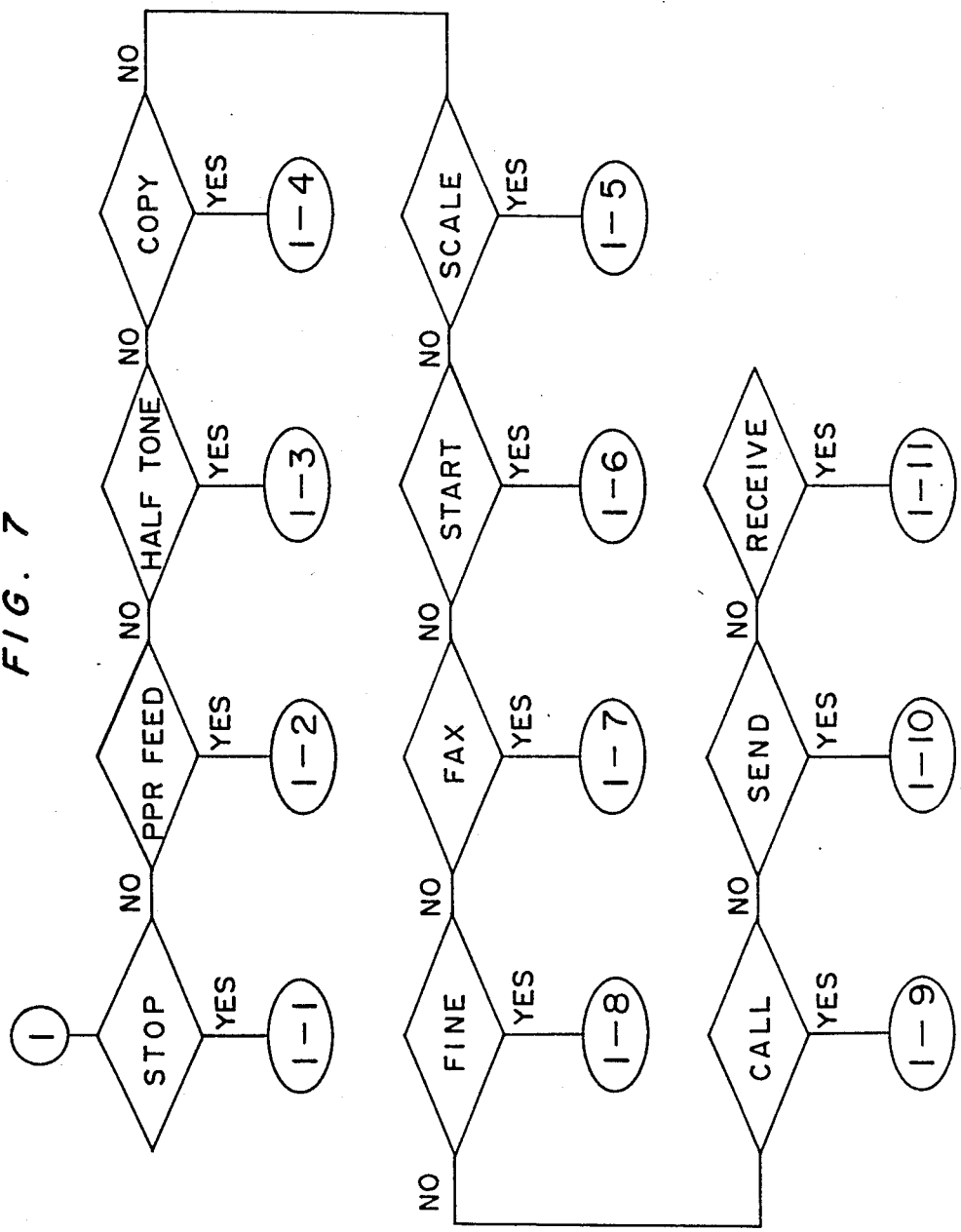

IMAGE PROCESSING DEVICE OF MULTIFUNCTIONAL TYPE

FIELD OF THE INVENTION

The present invention generally relates to an image processing device that is connected to an external data processing device such as a personal computer or the like. In particular, a multifunctional image processing device is provided which includes a main control portion, an image read control unit, an image recording control unit, a facsimile control unit, and an interface unit for connecting a personal computer as an external unit. The following functions are provided by controlling each unit with the main control portion: (1) copying documents, that is, recording image information outputted from the image read control unit, (2) recording image information generated in the personal computer, (3) displaying or filing image information outputted from the image read control unit at the personal computer, (4) transmitting via facsimile image information provided by the image read control unit, (5) transmitting via facsimile image information produced at the personal computer, (6) recording incoming image information sent via facsimile and/or filing the image information in the personal computer, and so on.

BACKGROUND OF THE INVENTION

The following devices are known as conventional image processing systems: a device which records or prints image information read by an image scanner by an image printer and/or supplies a computer with information; a facsimile device which memorizes image information received through a telephone line in an internal memory prior to recording the information; and similar devices.

In such conventional image processing systems, units such as the image scanner, image printer, facsimile device, and personal computer are independent of each other, and therefore, the systems cannot transmit image information read out of the image scanner or information produced at the personal computer via facsimile without the help of a separate facsimile device. Also, the traditional systems cannot synthesize image information received by the facsimile device with another image information by using the personal computer or a similar device. According to the traditional systems, units having respective functions are not connected to each other internally, so that data reciprocation between units is impossible and moreover transmission of data produced by other units via facsimile are time-consuming and troublesome.

SUMMARY OF THE INVENTION

Accordingly, the present invention has been developed with a view to substantially eliminate the above described disadvantages inherent in the conventional devices and for its essential object provides a multifunctional image processing device which functions similarly to an image recording unit such as the image scanner and the image printer, and to the facsimile device for effecting image transmission between such units. Thereby, various kinds of image processing is realized.

In accomplishing this object, a multifunctional image processing device, according to one preferred embodiment of the present invention, includes a housing, an image read control unit for reading images according to control information, a facsimile control unit for sending and receiving image information through a telephone line according to control information, an image record control unit for recording image information according to control information, an interface unit connected to an external data processing device for transferring control commands and image information to and from the data processing device, bus lines for connecting the image read control unit, the facsimile control unit, the image record control unit and the interface unit to each other, and a main control unit connected to the bus lines for controlling the information transmission between each pair of units according to the respective control commands sent through the interface unit. Thereby, each unit is individually controlled by outputting the respective control information thereto, and all of the above units are accommodated in the housing.

This multifunctional image processing device functions as follows:

When the device is in an off-line control status, the device is operated independently from the data processing device as an external device connected thereto through the interface unit and the following functions are effected selectively.

(1) COPY function . . . Image information read by the image read control unit is supplied to the image recording unit on a data bus and printed by the unit according to the control information transferred from the main control unit.

(2) FACSIMILE function . . . The image information read by the image read control unit is transferred to the facsimile control unit and then transmitted therefrom through the telephone line, according to the control information outputted from the main control. On the other hand, image information received through the telephone line is recorded by the image record control unit.

Meanwhile, when the present device is in an on-line control status, the following functions are selectively executed according to control commands provided to the device by the external data processing device connected to the device.

(3) IMAGE INPUT function . . . The image information read by the image read control unit is transferred to the data processing device on the data bus according to control commands.

(4) IMAGE PRINT function . . . The image information sent from the external data processing device is recorded by the image record control unit.

(5) FACSIMILE function . . . Image information received by the facsimile control unit through the telephone line is transferred to the external data processing device. Also, image information inputted from the external data processing device is transmitted by the facsimile control unit through the telephone line.

Furthermore, functions corresponding to the above independent functions (1) and (2) are also effected based on the control commands provided by the external data processing device through the bus lines connected to the processing device through the bus lines connected to the respective units. Moreover, the synthesis and editing of image data is executed by combining the above functions with each other, and various image processing functions are carried out without difficulties.

These features and advantages of the present invention will become more apparent with reference to the following detailed description of a preferred embodiment thereof in connection with the accompanying drawings.

BRIEF DESCRIPTION OF THE DRAWINGS

FIGS. 7 through FIG. 8e are flow charts for processes carried out in the off-line control status of the device.

DETAILED DESCRIPTION OF THE PREFERRED EMBODIMENTS

Figure 1:
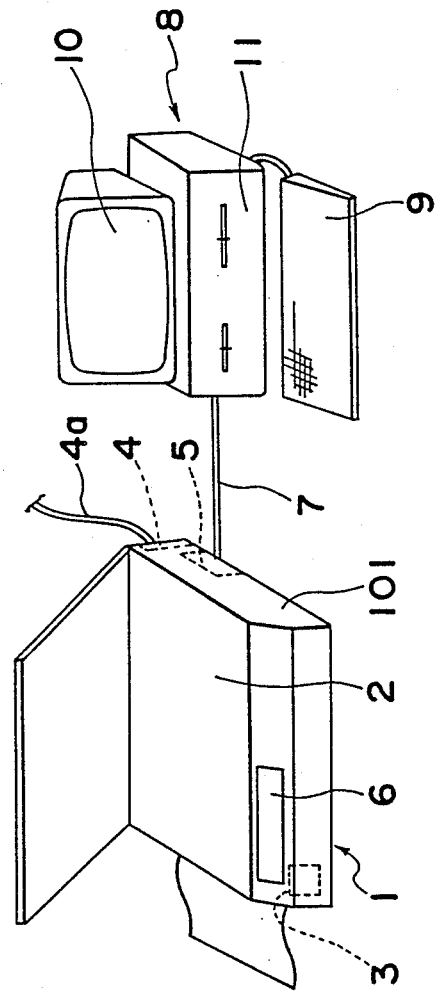
FIG. 1 shows a schematic view of a multifunctional image data processing device of a preferred embodiment of the invention that is connected to a personal computer.

FIG. 1 schematically shows a system consisting of a multifunctional image processing device and a personal computer that is connected to the device. In the system, reference number 1 designates an image processing device of a multifunctional type, which includes a housing 101, an image scanner 2 functions in an image read control unit for reading a fixed and mounted document line by line by a line CCD sensor (a line sensor constituted of a charge coupled device), an image printer 3 functions in the image record control unit for recording image information using a line thermal head and record paper, a facsimile control unit 4 is connected to a telephone line 4a, and a bidirectional parallel interface unit 5 connects the personal computer and external device 8 through a cable 7. On the front face of the device 1 there is provided an operating panel 6 for operating the device 1. The personal computer 8 includes a CRT display 10, a keyboard device 9, and a floppy disk device 11. Various image and data processing are carried out by the computer 8 according to the programs for respective applications. The personal computer 8 stores preset control commands (to be referred to later) and provides the image processing device 1 with the control commands according to the respective application programs or to an input from the keyboard 9 for controlling various image processing.

Figure 2:
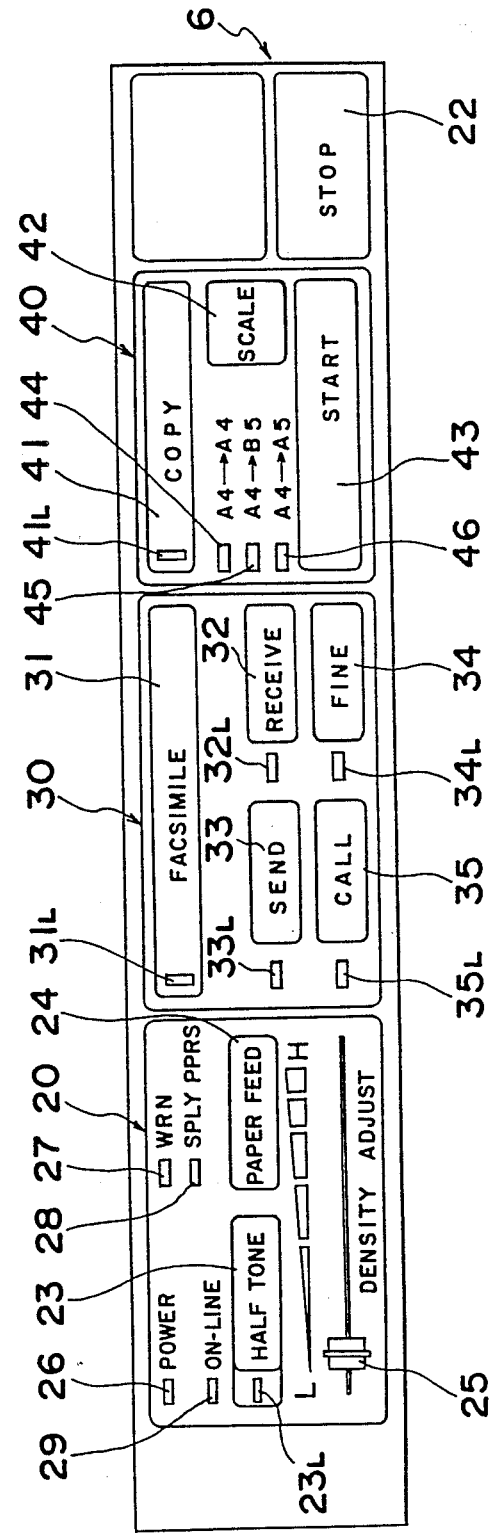
FIG. 2 shows an operating panel fixed to the device.

The operating panel 6 shown in detail in FIG. 2 includes an operating portion 20 for the whole device 1, an operating portion 30 for the facsimile function, and an operating portion 40 for the copy function.

In the operating portion 20 for the device, an on-line lamp 29 is turned on when the personal computer 8 gives the device 1 a control command which electrically connects the device 1 to the personal computer 8, that is, an on-line status is generated. In the on-line status, all keys except for a STOP key 22 on the panel 6 are deemed to be invalid and the device 1 acts only under the instructions given by the personal computer 8. On the other hand, in the off-line status, all key inputs are valid and the device 1 rejects instructions transferred from the personal computer 8. HALF TONE 23 is a key for instructing whether to read a document by bi-level values or to read it according to a predetermined tone. When an operator orders the device 1 to read a document in HALF tone by depressing the HALF TONE key 23, a HALF TONE lamp 23L is turned on. PAPER FEED 24 is a key used to let paper being set at the image printed 3 to advance without the occurrence of any printing. DENSITY ADJUST 25 is a sliding key used for adjusting density with which the document is to be read. The density adjustment is carried out by varying the standard level for deciding a border between black and white. Reference numeral 26, 27, and 28 are indicator lamps. POWER 26 is a lamp that is turned on when the device 1 is powered on, WRN 27 is a lamp for indicating problems in each of the respective units, and SPLY PPR 28 is a lamp for indicating shortage of the paper at the image printer 3.

In the operating portion 30 for the facsimile function, FACSIMILE 31 is an instructing key which causes the device 1 to act as a facsimile device. FACSIMILE lamp 31L is turned on when the device 1 is set for the facsimile mode. RECEIVE 32 is a key for setting the facsimile for the transmission mode and when this setting is completed, a lamp 33L is turned on. FINE 34 is a key for setting line density to 4 lines/mm or 7.7 lines/mm. When the latter setting is selected, a lamp 34L is turned on. CALL 35 is a key for requesting a call when the transmission or the reception via facsimile of a document is completed. When key 35 is depressed, a lamp 35L is turned on.

In the operating Portion 40 for the copy function, a COPY 41 key is provided for setting the device 1 in the document copY mode. When this key 41 is depressed and the device 1 is set for the copy mode, a lamp 41L is turned on. SCALE 42 is a key for determining the scale in copying a document. The scale is set to any one of A4→A4 (same size), A4→B5 and A4→A5 by depressing SCALE 42 a Plurality of times. Then one of the lamps 44, 45, and 46 corresponding to the respective scales A4→A4, A4→B5, and A4→A5 is turned on in accordance with the scale selection. START 43 is a key for giving instructions to start copying. STOP 22 is a key for halting or stopping each unit during an operation process.

Figure 3:
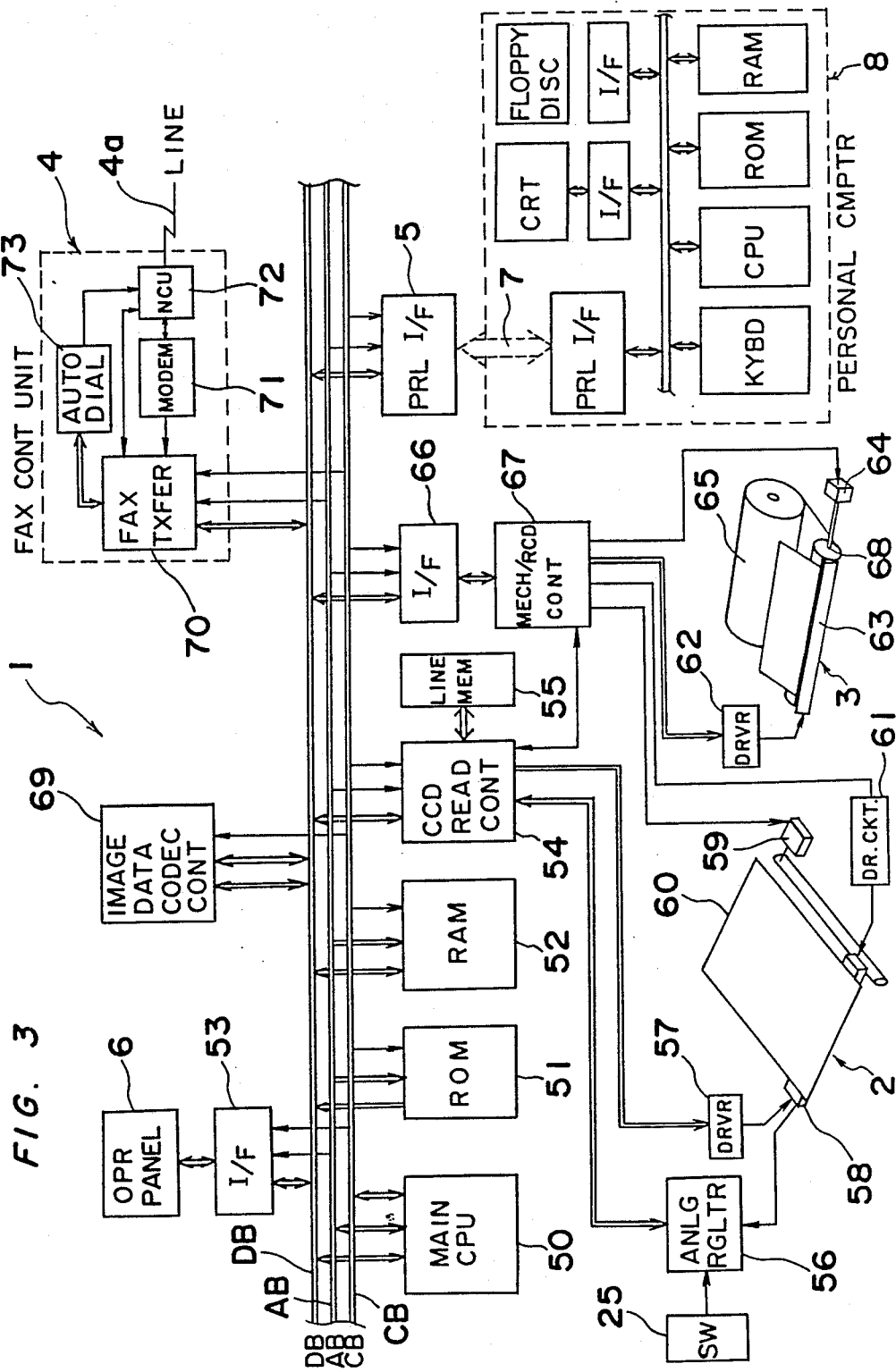
FIG. 3 is a block diagram corresponding to FIG. 1.

FIG. 3 is a block diagram of the device 1 having the personal computer 8 being connected thereto. Reference numeral 50 designates a main CPU as the main control unit for controlling the device 1 in accordance with each of the system programs stored in a read-only memory (ROM) 51 in advance. To the main CPU, a common data bus DB, an address bus AB, and a control bus CB are connected thereto. The following units are connected to each of the busses DB, AB, and CB and are controlled by the main CPU 50. The ROM 51, a random-access memory (RAM) 52, a CCD read control portion 54 containing a slave CPU, an image data codec control portion 69 containing a slave CPU, a facsimile transmission control portion 70 containing a slave CPU, an interface 53 for connecting the operating panel 6, another interface 66 for connecting a mechanism, and a record control portion 67, and the parallel interface 5 for connecting the personal computer 8 are shown in FIG. 3. Besides the system programs, a ROM 51 is also provided which has a command analyzing portion for transferring data and receiving data from the personal computer 8.

Figures 4, 5:
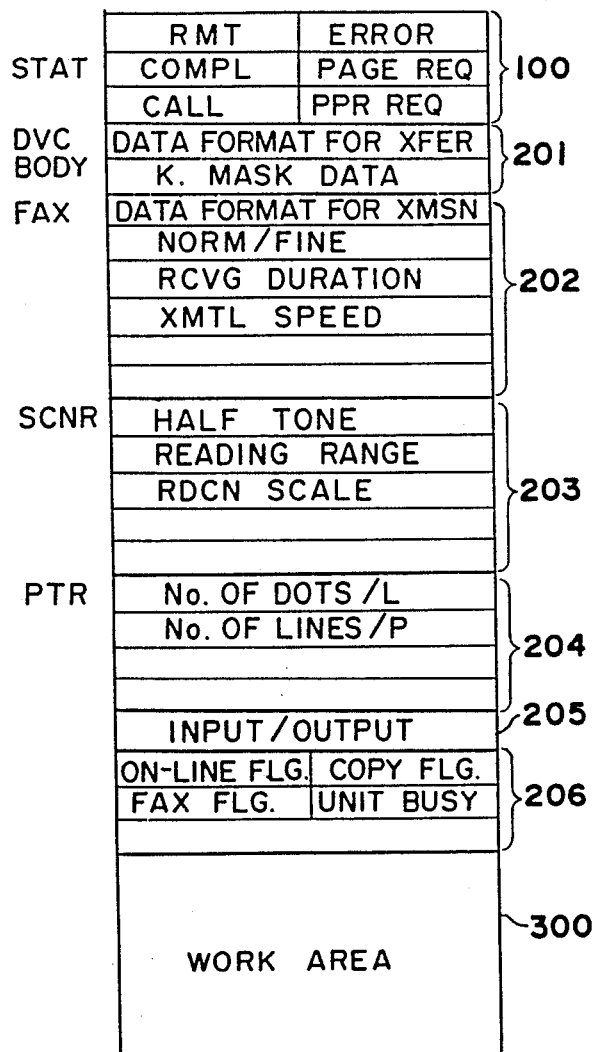
FIG. 4 shows the construction of a RAM that is included in the device.
FIG. 5 shows an example of I/O setting codes.

As shown in FIG. 4, a RAM 52 consists of a plurality of areas. A status area 100 stores information representing the status of the device 1, unit setting areas 201 through 205 for storing set values relative to respective function units, a flag area 206, and a work area 200 which includes various kinds of buffers and similar devices are shown.

The CCD read control portion 54 is operated when the device 1 works as a facsimile device in a transmission mode, a copy mode or a scanning mode. The mechanism and record control portion 67 includes a slave CPU and functions in a printing mode in addition to the above modes. Such a construction being made of the combination of the CCD read control portion 54 with the mechanism and record control portion 67 is substantially the same as the construction of generally known facsimile devices.

A scanning panel 60, shown in FIG. 3 of the image scanner 2, is formed of a transparent sheet, such as glass or a similar material on which a document to be read is placed on the panel 60. The document is fixed on the scanning panel 60 by a white plate (not shown). Under the scanning panel 60, the CCD sensor 58 extending in the main scanning direction is provided. The CCD sensor 58 is moved by a motor 59 in the subscanning direction which perpendicularly intersects the main scanning direction. A fluorescent lamp (not shown) which acts as a light source, is placed near the CCD sensor 58 and is moved together with the sensor. Light coming from the light source irradiates the document and the light reflected by the document is introduced into the CCD sensor 58.

The CCD sensor 58 carries out the reading operation by timing pulses transferred from a driver 57 that is controlled by the CCD read control portion 54. Analog signals outputted from the CCD sensor 58 are supplied to an analog regulating circuit 56, in which the analog signals are converted to a digital form in accordance with a predetermined density level or slice level. The image data is obtained in a digital form and is supplied to the CCD read control portion 54. When the HALF tone mode is selected, the analog signals outputted from the CCD sensor 58 are converted to a digital form according to a predetermined HALF tone level. The image data obtained in either way is stored in a line memory 55 connected to the CCD read control portion 54 which has a capacity for information in one line of a document and then the data for each line is outputted therefrom to the data bus DB.

A mechanism control section of the mechanism and record control portion 67 drives a motor 59 for transferring the CCD sensor 58 line by line in the subscanning direction, whereby a reading operation is effected line by line. If necessary, the CCD sensor 58 may be controlled by skipping lines. The mechanism and record control portion 67 contains the mechanism control section and an image printer control section, which includes a line buffer for storing line data to be recorded.

The image data codec control portion 69 controls the encoding of modified Huffman (MH) or modified relative element address designate (MR) compression codes of CCITT standard into binary data and the decoding of the latter data into the former data. This encoding and decoding control technique is well known in facsimile devices generally used. The image data codec control portion 69 is operated when (1) the device 1 is in a facsimile status, (2) image data read by the image scanner 2 is compressed and then transferred to the personal computer 8, (3) compression data sent from the personal computer 8 is recorded by the image printer 3, and (4) binary image data outputted from the personal computer 8 is transmitted via facsimile. Accordingly, the image data codec control portion 69 includes algorithms, buffers, and similar components for encoding and decoding.

The facsimile control unit 4 for controlling transmission and reception via facsimile is substantially the same as a transmission control system for a generally used facsimile device. The facsimile transmission control portion 70 contains a slave CPU for controlling the data transmission procedure based on the CCITT standard and exchanges data with the data bus DB according to the transmission procedure. The facsimile transmission control portion 70 is connected to the telephone line 4a through a MODEM 71 and a network control unit (NCU) 72. An automatic dial unit 73 connects the circuit according to dial information provided by the personal computer 8. In a manual dialing operation, a telephone is connected to the NCU 72.

The parallel interface for connecting the personal computer 8, external device, to the device 1 is provided with a buffer for data of one byte, for example. The personal computer 8 supplies the parallel interface 5 with various kinds of commands and data, whereby the above mentioned units transfer data to each other. The personal computer 8 is substantially of the same construction as other personal computers that are generally used. The personal computer 8 is connected to the device 1 by connecting parallel interfaces of the personal computer 8 and of the device 1 through a cable 7. The personal computer 8 controls the device 1 by outputting various kinds of commands to the device 1 in accordance with programs stored in advance in a RAM or a ROM. Therefore, various functions, as mentioned above, can be realized by operating the personal computer 8. Furthermore, image data supplied by the device 1 can be displayed on the CRT display unit of the personal computer 8 and/or filed in a floppy disk by the floppy disk device of the personal computer 8. Additionally, image data produced according to a program of the personal computer 8 can be transferred to the device 1 for recording and/or transmitting via facsimile.

An interface 53 is for connecting the operating panel 6 shown in FIG. 2, to the buses DB, AD, CB, as shown in FIG. 3.

The device 1 has the following functions:
A. Functions obtained when the device 1 is operated independent of the personal computer 8 (OFF-LINE control)

(1) COPY function

When the COPY key 41 is depressed, the device 1 starts the operation. The image scanner 2 reads image data of a document to be copied and supplies the image printer 3 with the data so that the image printer 3 may print the document.

(2) FACSIMILE function

This is a function obtained when the FACSIMILE key 31 is operated. The device 1 encodes image data read by the image scanner 2 into compression codes by the image codec control portion 69 and transmits the encoded data via facsimile by the facsimile control unit 4. Also, the device 1 decodes information received via facsimile through the telephone line 4a into binary data by the image data codec control portion 69 and records the data by the image printer 3.

B. Functions obtained when the device 1 is operated under the control of the personal computer 8 (ON-LINE control)

(1) IMAGE INPUT function

The device 1 outputs image data read by the image scanner 2 to the personal computer 8. The personal computer 8 displays the data on the CRT display unit and/or files the data in a floppy disk.

(2) IMAGE PRINT function

The image printer 3 of the device 1 records image data transferred by the Personal computer 8.

(3) FACSIMILE INPUT function

The device 1 outputs image data received via facsimile to the personal computer 8, which displays the data on the CRT display unit and/or files the data in a floppy disk.

(4) FACSIMILE TRANSMISSION function

The device 1 transmits image data outputted from the personal computer 8 through the telephone line 4a.

(5) IMAGE DATA CONVERSION function

The device 1 converts binary data or compressed data, of an image, outputted by the personal computer 8 into compressed or binary data, respectively, at the image data codec control portion 69.

(6) COPY and FACSIMILE functions

Functions corresponding to the above independent functions obtained when the device 1 is in an off-line state and are also effected under the control of the personal computer 8.

The following descriptions are for the control commands which the personal computer 8 outputs in order to control the device 1.

(1) STATUS REQUEST command

This is a command outputted when the computer 8 requests the device 1 to report on an actual status thereof so as to control the device 1. In response to this command, the device 1 reports on (1) whether or not the remote control is available, (2) whether or not there are errors, (3) whether or not the previous operation has been completed, (4) whether or not a next page is required in the facsimile reception, (5) whether or into a call is requested in the facsimile transmission, and (6) whether or not paper is required to be supplied to the image printer. The status data, in relation to the above status, are stored in the status area 100 of the RAM 52, as shown in FIG. 4.

(2) STOP command

This is a command for instructing the device 1 to stop controlling.

(3) DATA TRANSMISSION AND RECEPTION command

This is a command for instructing the device 1 to get ready for receiving or transmitting data prior to starting.

(4) CALL REQUEST command

This is a command for instructing the device 1 to give a call over the telephone when the data transmission via facsimile is completed.

(5) SUPPLY NEXT PAGE command

This is a command for instructing the device 1 to supply data of the next page when data corresponding to a plurality of pages of a document are outputted from the personal computer 8 so as to be transmitted via facsimile.

(6) SCANNER'S SKIP command

This is a command for instructing the device 1 to determine the quantity by which the image scanner 2 should be advanced or to skip the scanning of a document.

(7) PRINTER CONTROL command

This is a command in relation to the control of the image printer 3 such as "line feed", "page end", and so on.

(8) UNIT SETTING command

This is a command for instructing the device 1 to set conditions so that each unit functions proper to the whole device 1, facsimile, image scanner, and image printer. Such condition setting is partially presented hereinafter.

(a) Condition setting for the whole device,
(i) Data format for the transfer between the device 1 and the personal computer 8.....necessity of compression, MH or MR encoding method;
(ii) Validity of each key input (key masking);
(b) Condition setting for the facsimile,
(i) Data format for transmission.....MH or MR encoding method;
(ii) Document line density for transmission . . . 4 lines/mm (standard) or 7.7 lines/mm (fine);
(iii) Data reception duration . . . 5 ms, 10 ms or 20 ms;
(iv) Transmission speed . . . 4800 bps or 2400 bps;
(c) Condition setting for the image scanner,
(i) HALF tone;
(ii) Reading range of a document that the image scanner should read;
(iii) Scale;
(d) Condition setting for the image printer,
(i) Printer letter in the main scanning direction;
(ii) Number of bits per line for requiring a line feed; and
(iii) Number of lines per page.

(9) I/O SETTING command,

This is a command for instructing the device 1 to determine an input device and an output device. The personal computer 8, the facsimile unit 4, and/or the image scanner 2 are determined to be used as input units in combination with the personal computer 8, the facsimile unit 4, or the image printer 3, as an output unit. The combination is determined by coded set values, as shown in FIG. 5, which are accompanied by a code representing this command.

The set values corresponding to the above unit setting conditions are stored in the respective areas of RAM 52, as shown in FIG. 4, and some of the set values are read out and supplied to the respective units according to the commands.

The device 1 of the above construction acts as follows:

FIGS. 6 through 10d are flow charts showing programs to be carried out by the device 1. The following description is given according to those figures (the personal computer 8 will be referred to as a host hereinafter).

1. INITIAL SETTING

Figure 6:
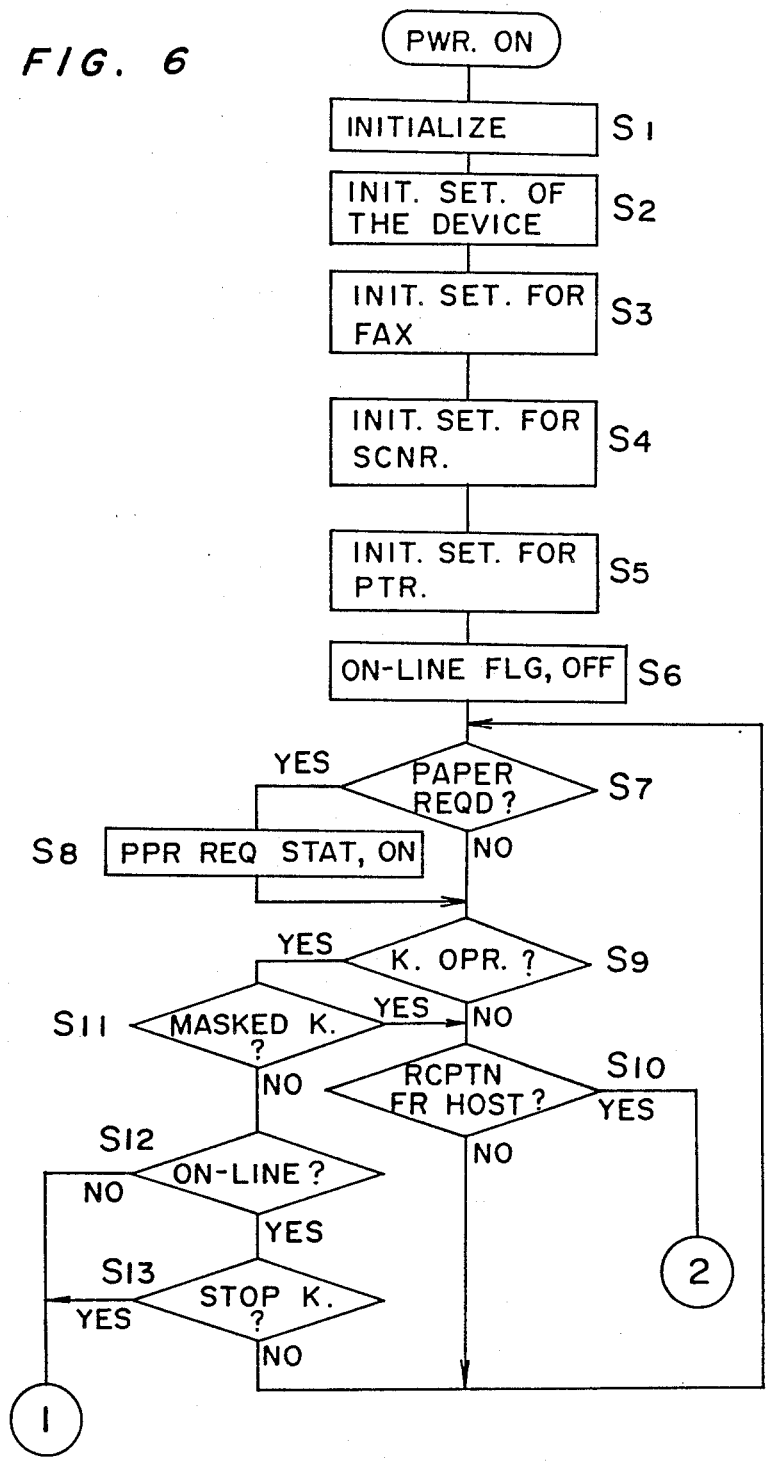
FIG. 6 is a flow chart of the main program for the device.

When the device 1 is powered on, the program shown in FIG. 6 is carried out.

At step S1, the circuit element and input portions are initialized so as to be in a reset status. Then, at step S2, initial values for the whole device 1 are set and stored in the areas 201 of RAM 52. For example:

(i) The format of data to be transferred to and from the host 8 is set to modify Huffman compression codes; and (ii) Keys are released from the mask in order for every key to be made available or for input therefrom to be valid.

Subsequently, at step S3, initial values for the facsimile function are set and stored in the area 202 of RAM 52. For example:

(i) Data format for transmission . . . modified Huffman codes;

(ii) Line density . . . a fine mode (7.7 lines/mm);

(iii) Time required for data reception . . . 20 ms (the minimum time for a line transmission); and (iv) Transmission speed . . . 4800 bps (this means a transmission rate at the modem 71).

At step S4, initial values for the scanning function are set and stored in the area 203 of RAM 52. For example:

(i) No HALF tone;

(ii) The scanner's reading range . . . A4 size in width from the top of document; and (iii) Scale . . . A4→A4 (same size).

Then, at step S5, an initial setting for the printing function is carried out and set values are stored in the area 204 of RAM 52. For example:

(i) The length in the main scanning length . . . A4 size in width;

(ii) The quantity for line feed . . . 30 dots per line; and (iii) The number of lines per page . . . 66 lines.

The setting of input and output devices for the area 205 of RAM 52 is not carried out in this stage.

At step S6, the on-line flag in the area 206 of RAM 52 is set to be off for enabling local or off-line control. All initial setting is completed at this step.

Subsequently, at stp S7, it is determined whether or not the printer 3 is running out of paper, in other words, whether paper should be supplied. When additional paper is necessary, that is, the printer is not provided with paper, the program proceeds to step S8 where a PAPER REQUEST status is set on and the lamp 28 on the operating panel 6 shown in FIG. 2 is turned on. At step S9, it is determined whether or not keys on the panel 6 have or have not been operated. When it is determined that a key has not been operated, the program proceeds to step 10 and it is determined whether or not the device 1 has received data from the host 8. When a negative answer is produced, the program returns to step S7 and repeats steps S7, S9, and S10 in order to wait for some input from the keys on the operating panel 6 or from the host 8. During such a waiting state, either the local (off-line) control or the remote (on-line) control is started when there is some key input or command from the host 8, as follows:

A. THE LOCAL (OFF-LINE) CONTROL

When it is determined at step 9 that a key is operated, the program proceeds to step S11 where it is determined whether or not the key is masked. When the key is masked, the key input cannot be accepted so that he program proceeds to step S10. When the key is not masked, it is determined at step S12 whether or not the device 1 is under the control of the host 8, that is, whether the device 1 is in an on-line state. When the device 1 is in an on-line state, it is determined at step S13 if the key input is not accepted and the program returns to step S7 and waits for further key input or data input from the host 8. When it is determined at step S12 that the device 1 is not in an on-line state or when it is determined at step S13 that the depressed key is STOP 22, the program proceeds to ①, as shown in FIG. 7 and processing under the local control is carried out.

The following describes the program to be carried out when the respective keys on the operating panel 6 are depressed during the waiting state.

(1) STOP key

Figure 8A:
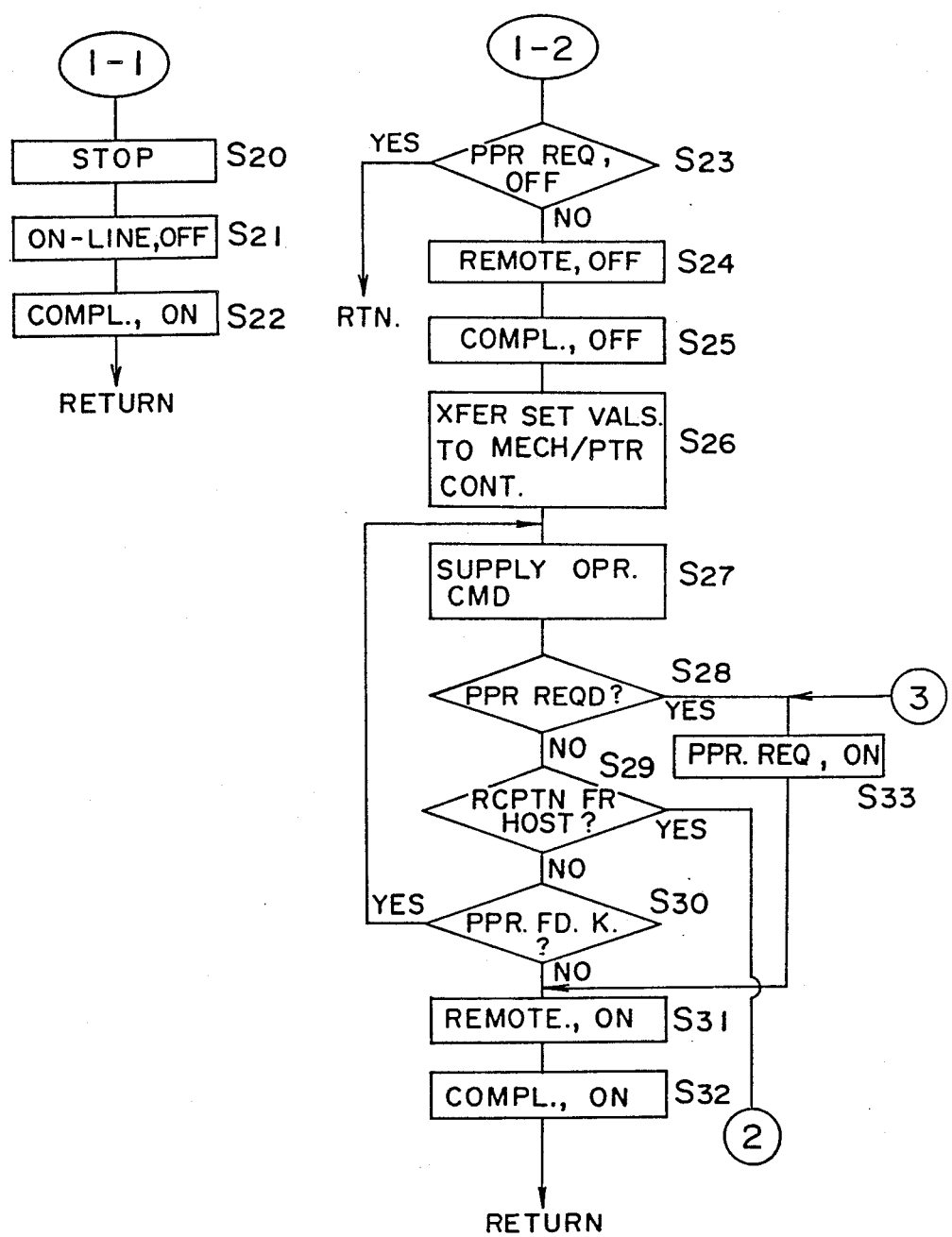

When this key is depressed, the program goes to (1-1) of FIG. 8a. First, at step S20, a task being carried out is stopped and instructions to finish are transferred to each control portion. The instructions cause each control portion to keep a waiting state unit the portion receives the next instructions. The task stop is effected by recognizing the completion of a control command even when the task is done under the control of the host 8.

At step S21, the on-line flag is turned off (when the on-line flag has been off, the flag state does not change).

At step S22, the completion flag indicating the completion of the operation is turned on.

After the above process, the program returns to step S7 of FIG. 6 and repeats S7, S9, and S10 and waits for a further key input.

(2) PAPER FEED key

When this key is depressed, the program branches to (1-2), as shown in FIGS. 7 and 8a.

At step S23, it is determined whether or not the paper request status is OFF. When the paper request status is ON because paper shortage has been detected during the waiting state, the program returns to step S7 without feeding paper.

When the paper request status is OFF, the program proceeds to step S24 and the remote status (in the area 100 of RAM 52 of FIG. 4) is turned off, whereby the control by the host 8 is prohibited. At step S25, the completion status is turned off in order to show that the device 1 is in operation. Then at step S26, a preset value, stored in the area 204, in relation to the printer (in this case, the number of dots for line feed) is supplied to the mechanism and the record control portion 67. At step S27, the transfer of operating instructions (in this case, instructions to feed a line) to the control portion 67 follows the supply of the set value. According to the instructions, the mechanism and the record control portion 67 determine the dot quantity for paper feed or dots per line and then determines the revolution quantity of the motor 64 based on the dot quantity for paper feed. Thereafter, the control portion 67 drives the motor 64.

During the driving of the motor 64, the determination for the paper request and the reception of data from the host 8 are done at steps S28 and S29, respectively. When it is judged at step S28 that paper is required, the program goes to step S33 where the paper request status is turned on (the lamp 28 is turned on). Then, at step S31, the remote status is turned on and thereafter, at step S32, the completion status is turned on to finish this operation. On the other hand, when detecting the data reception from the host 8 at step S29, the program proceeds to step S200 of FIG. 9. When there is no data from the host 8 at step A29, the program proceeds to step S30 and it is determined whether or not the PAPER FEED key 24 is still depressed. When depression of that key is detected again after carrying out the foregoing operation, steps S27 through S30 are repeated until the PAPER FEED 24 is realized. When the operation of the PAPER FEED key 234 is stopped, the program returns to step S7 of FIG. 6 via steps S31 and S32.

With the above procedure, the amount of paper that is required by an operator is fed.

(3) HALF TONE key

Figure 8B:
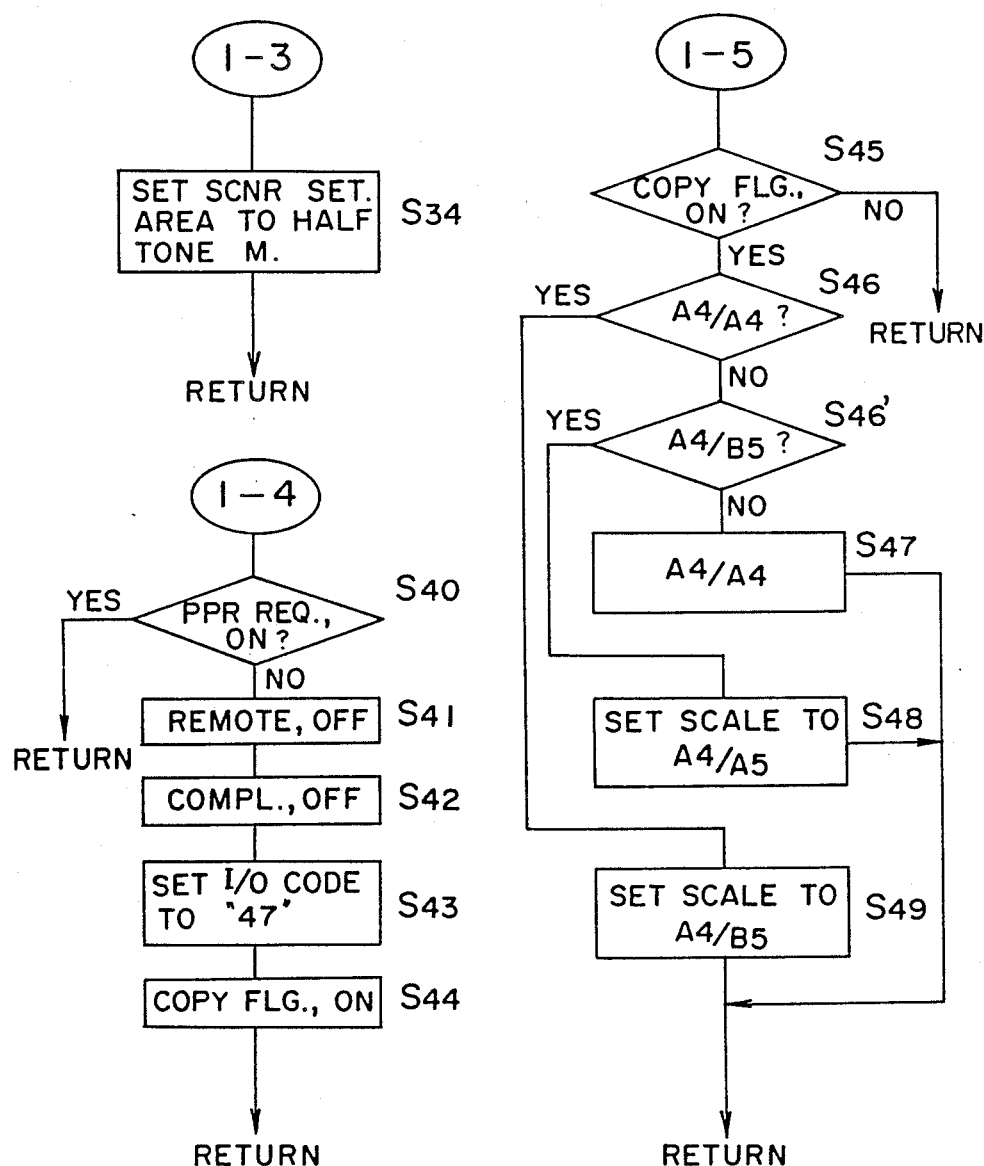

Depression of this key 23 leads the program to routine (1-3) of FIG. 8b.

At step S34, the scanner setting area 203 of RAM 52, as shown in FIG. 4, is set for a HALF tone mode and the program returns to step S7 of FIG. 6.

The set value corresponding to the HALF tone mode is supplied to the CCD read control portion 54 according to the instructions, given later, to read an image. The CCD read control portion 54 determines the correspondence for a plurality of slice levels fixedly set in advance of the picture elements and provides the analog resulting circuit 55 with digital data in accordance with the respective determined levels. The CCD read control portion 54 determines the black level arrangement for each of the picture elements according to the digital values provided by the analog regulating circuit 56, as a model HALF tone, for example, and outputs the black level arrangement as read data. Such technology is generally known.

(4) COPY key, SCALE key, and START key

When the COPY key 41 is depressed, the program branches (1-4) of FIG. 8b and sets the device 1 in a copy mode, as described hereinafter.

At step S40 it is determined whether or not the paper request status is ON. If the paper request status is ON, the program returns to step S7 of FIG. 6 in order to prohibit the acceptance of this key input. If the paper request status is not ON, the program proceeds to step S41, and the REMOTE status is turned off when the REMOTE status is in an ON-state for prohibiting the control by the host 8. Then, at step S42, the COMPLETION status is turned off and shows that the device is in operation. At step S43, the I/O setting code "47", shown in FIG. 5, of one byte, is stored in the area 205 of RAM 52 of FIG. 4. This I/O setting code "47" means that the image scanner 2 is selected as an input unit and the image printer 3 as an output unit. Thus, in response to the code "47", the device 1 can realize the copy function by outputting image data read by the image scanner 2 to the image printer 3 and record the image data.

At step S44, the copy flag is turned on and then, the program returns to step S7 of FIG. 6 for repeating steps S7, S9, and S10, and waits for another key input.

After depressing COPY 41, the operator may depress SCALE 42 or START 43. The STOP key 22 may be operated if the operator wants to cancel the copy order. Now, assuming that SCALE 42 is operated, the program branches to (1-5) of FIG. 8b.

At step S45, discrimination of the COPY flag is carried out. When the COPY flag is ON, the program advances. At steps S46 and S46', the previous scale setting is confirmed by determining whether or not the previous scale setting is A4/A4 and then whether the scale is A4/B5 or not. As understood from the arrangement order of scales in FIG. 2, each depression of the SCALE key 42 changes the scale setting in an order according to the arrangement order. Therefore, if step S46 determines that the previous setting is A4/B4, the scale is set to A4/B5 at step S49. When the previous setting is judged to be A4/B5 at step S46, the scale is set to A4/A5 at step S48. When the previous setting is judged to be neither A4/A4 nor A4/B5 at steps S46 and S46', the scale is set to A4/A4 at step S47. The newly set value is stored in the area 209 of RAM 52 and either one of the lamps 44, 45, and 46 (See FIG. 2), is turned on in response to the set value, and thereafter, the program returns.

Figure 8C:
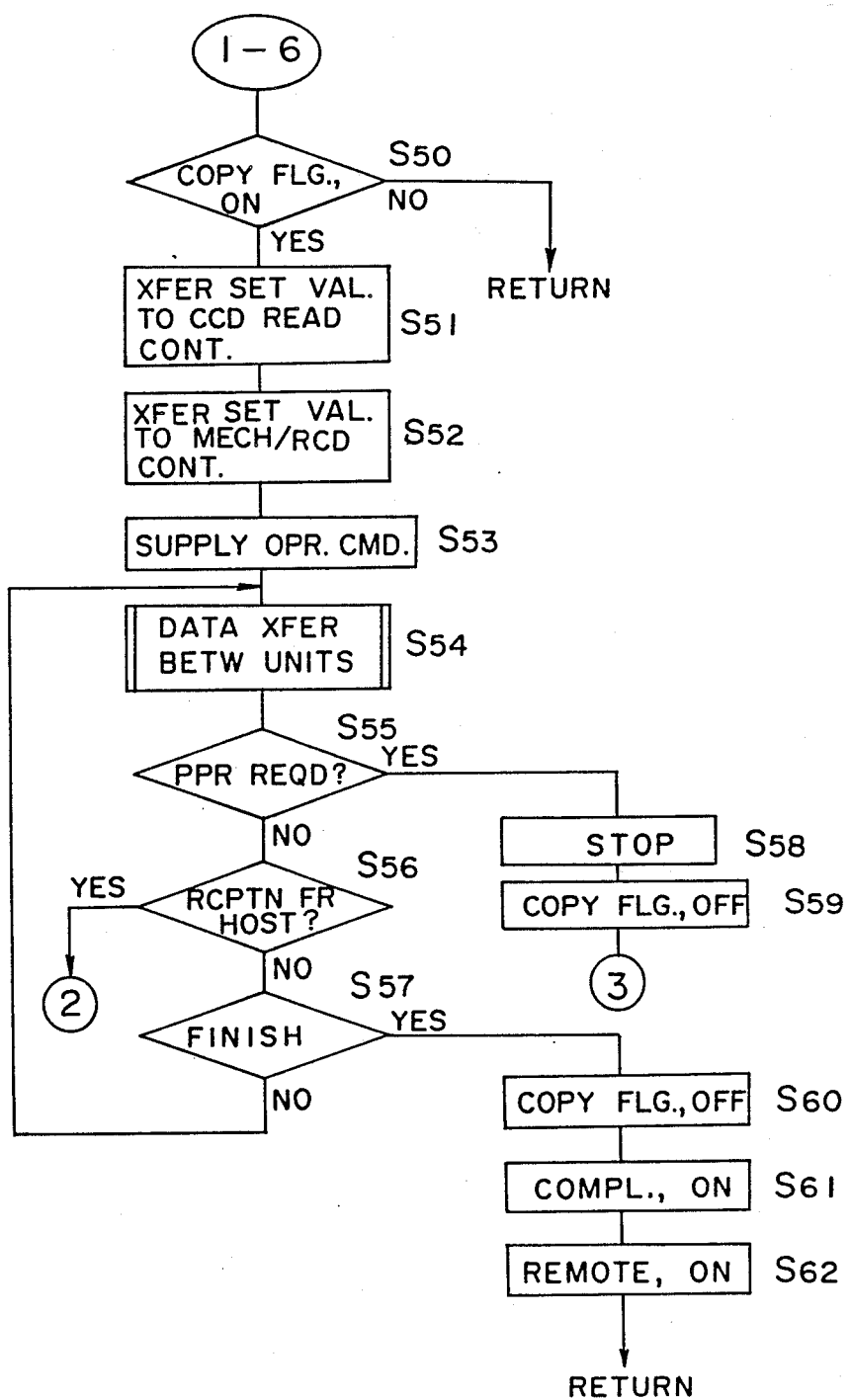

When operating the START key 43 after setting the above conditions, the program branches to (1-6) of FIG. 8c.

At step S50, discrimination of the COPY flag is carried out. When the COPY flag is not ON, the program returns to step S7 of FIG. 6 and prohibits the acceptance of this key. When the COPY flag is ON, the program, from step S51, is carried out based on the I/O setting effected at foregoing step S43.

Figure 8D:
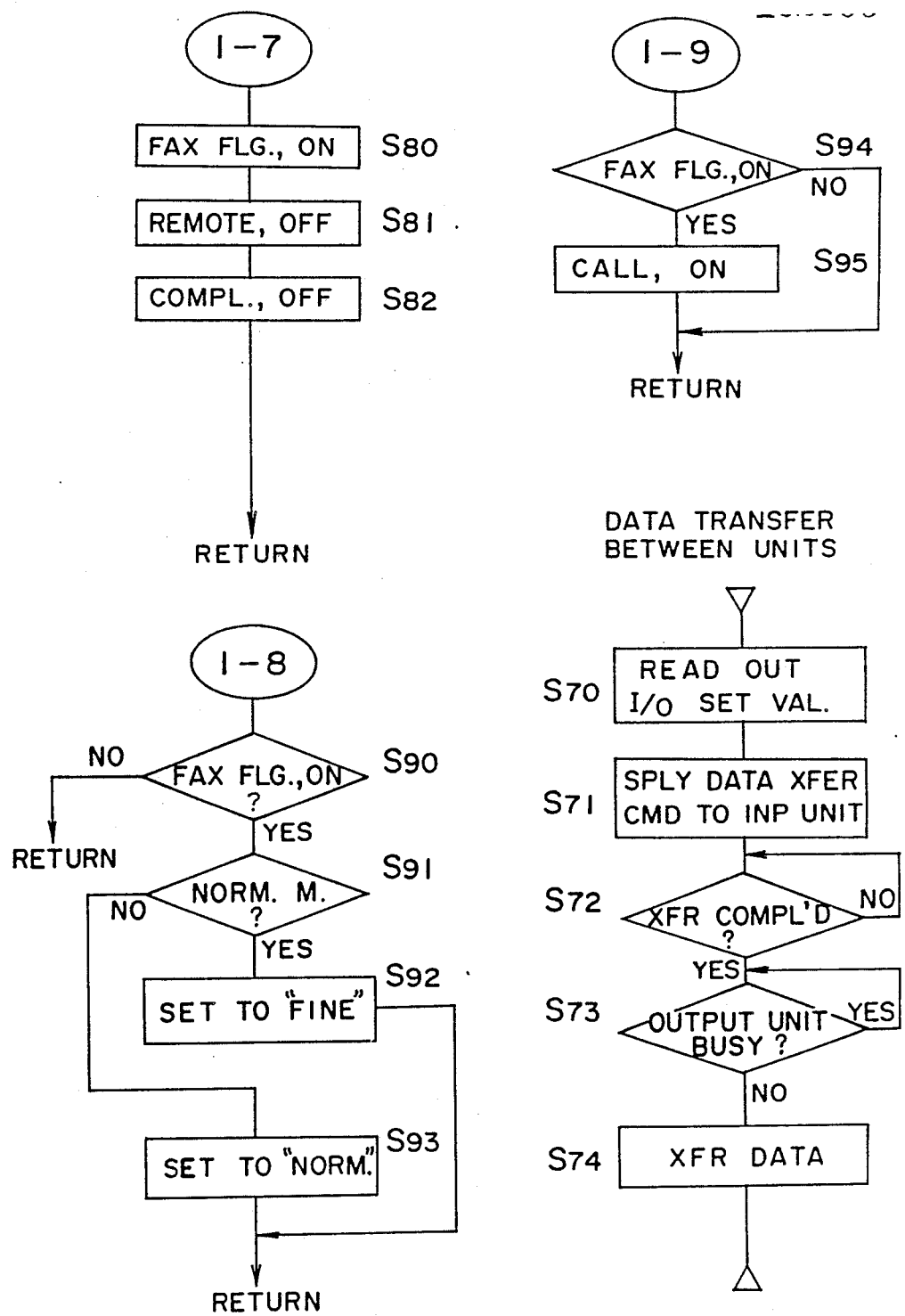

At the step S51, the set value stored in the area 203 for the scanner setting is supplied to the CCD read control portion 54. Then, at step S52, the set value stored in the area 204 for the printer setting is supplied to the mechanism and the record control portion 67 together with the above set value for the scanner. At step S53, operating instructions are given to both control portions 54 and 67, whereby, reading and recording of the document are started. At step S54, data read and outputted by the image scanner 2 is transferred to the image printer 3 line by line according to the subroutine of data transfer between units (the subroutine will be referred to later), as shown in FIG. 8d, until the document scanning for the preset reading range (stored in the scanner setting area 203 of RAM 52 of FIG. 4) is completed. During this process, it is determined whether or not paper is required at step S55. When paper shortage is detected as a result of this determination at step S55, the processing is stopped by operating the STOP key at step S58, and then, the copy flag is turned off at step S59. Thereafter, the program goes to step S33 of FIG. 8a. On the other hand, when data reception from the host 8 is detected at step S56, the program proceeds to step S200 of FIG. 9.

At step S57, it is determined whether or not the above routine has been finished. When the routine has been determined to be finished, the COPY flag is turned on at step S60, the COMPLETION status is turned on at step S61, and then the REMOTE status is turned on at step S62. Afterwards, the program returns to step S7 of FIG. 6.

Referring now to the subroutine of data transfer between units carried out at step S54 (see FIG. 8a), first, at step S79, the set value of a byte for the I/O setting code "47" is read out of the area 205 of RAM 52. The input and output units are determined by the set value. Then, at step S71, instructions to transfer data is given to the CCD read control portion 54 as an input. On receiving the instructions, the control portion 54 drives the driver 57 and analog regulating circuit 56 which causes one of line data to be read and converts the data into a digital form. The digital data is latched or taken hold of in a buffer inside of the CCD read control portion 54. Then, the motor 59 is driven by the mechanism and the record control portion 67 for moving the CCD sensor 58 to the next line. The data latched in the buffer is transferred on the data bus DB to the mechanism and the control portion 67. In the case that the printer is in operation (e.g. recording the previous line of a document) when the data is outputted to the mechanism and the record control portion 57, the data is temporarily stored in the line buffer inside the mechanism and the record control portion 67. The data transfer from the CCD read control portion 54 to the mechanism and the record control portion 67 may be done directly by a DMA controller, for example, or alternatively, the transfer may be done through the intermediary of the work area 300 of RAM 52. The above operation is effected by a time-sharing system.

When the set scale is a reduced scale such as A4/B5 or A4/A5, the CCD read control portion 54 performs a predetermined selection of data in the main and sub-scanning directions in reading data. Accordingly, document recording on a reduced scale is obtained by recording the selected data. Recording a document on a magnified scale is done similarly.

(5) FACSIMILE key, FINE key, CALL key, SEND key, and RECEIVE key

When the FACSIMILE key 31 is depressed, the program carries out (1-7) of FIG. 8d as follows:

The FAX flag is turned on, the REMOTE status is turned off and the COMPLETION status is turned off respectively at steps S80, S81 and S82. By so doing, the device 1 is set in a facsimile mode similar to a generally used facsimile device and the program returns to step S7 of FIG. 6 and repeats steps S7, S9 and S10. The following procedure is taken in accordance with key input of FINE, CALL, RECEIVE or SEND key.

First, in the case when the FINE key 34 is depressed, (1-8) of FIG. 8d is carried out. At step S90, it is determined whether or not the FAX flag is ON. When the FAX flag is OFF, the program returns to step S7 of FIG. 6 in order to prohibit the acceptance of this key input. When the flag is ON, the program proceeds to step S91, and a previous set value, stored in the area 202 of RAM 52, in relation to line density is confirmed by determining whether the previous line density is of the normal mode. When the line is of the normal code, a value to be stored in the area 202 is set for the fine mode at step S92 and thereafter, the program returns. On the other hand, when the line density is determined not to be of the normal mode at step S91, the line density is reset for the normal mode at step S93 and the program returns to step S7 of FIG. 6. When the line density is set for the fine mode, the lamp 34 on the operating panel 6 of FIG. 2 is turned on.

In the case that the CALL key 35 is depressed, (1-9) of FIG. 8d is carried out.

At step S94, it is determined whether or not the FAX flag is ON. With this flag being OFF, the program returns to step S7 of FIG. 6 and prohibits the key input of this key. When the FAX flag is ON, the program proceeds to step S95 where the CALL status in the status area 100 of RAM 52 is turned on and the program returns. The call request is accepted at the end of the facsimile transmission. After completing such a condition setting, data transmission or reception is carried out by the depression of the SEND or RECEIVE key as will be described later. The key operation for sending data is done when the circuit connection is completed, while data is received when the circuit connection is realized by data incoming.

Figure 8E:
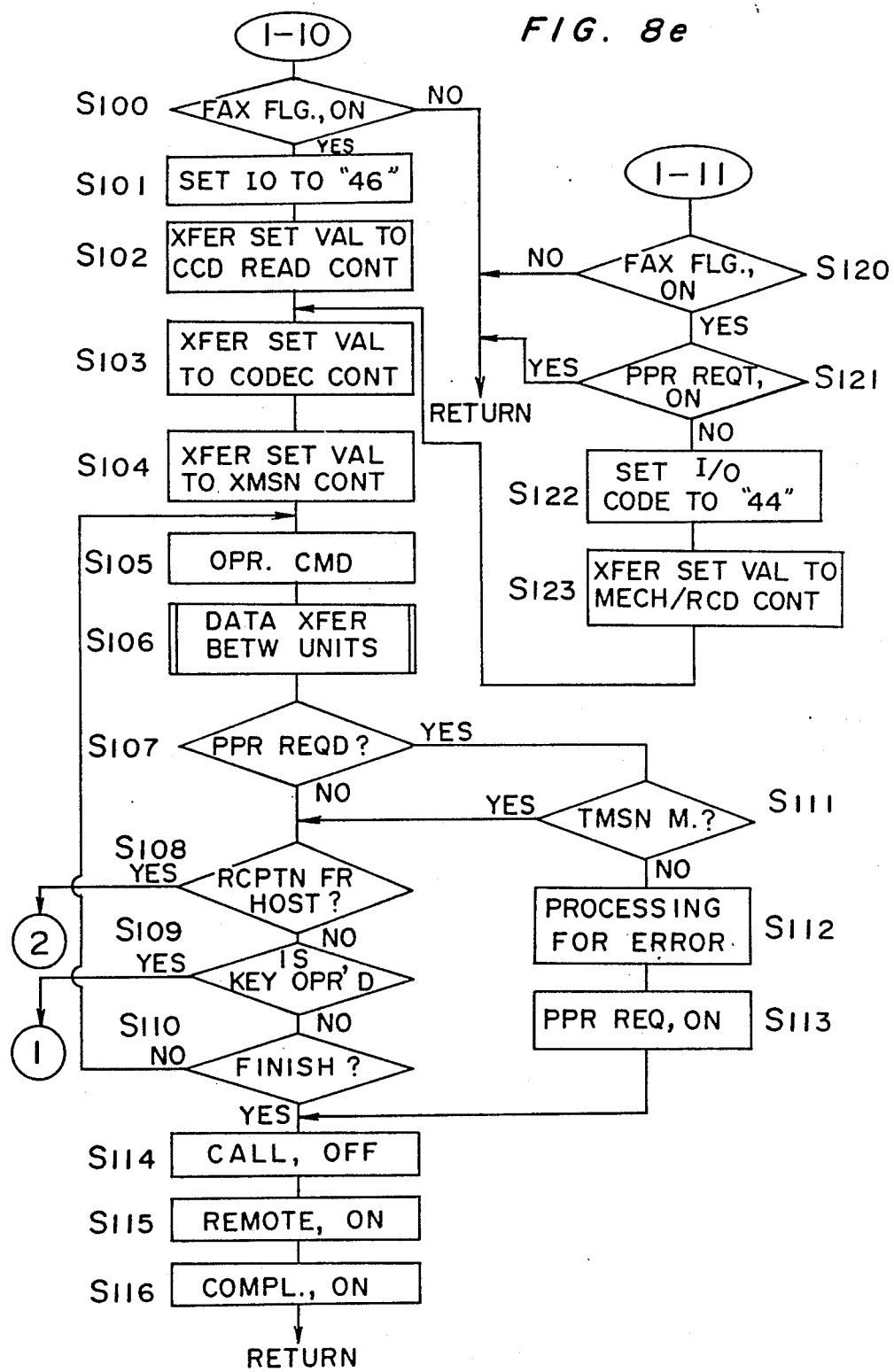

When the SEND key 33 is depressed, (1-10) of FIG. 8e is carried out.

At step S100, it is determined whether or not the FAX flag is ON. When the FAX flag is OFF, the program returns to step S7 of FIG. 6 and prohibits the acceptance of the key input of SEND key 33. On the other hand, when the flag is ON, which means that the circuit connection has been completed, the program proceeds to step S101 and the I/O setting code "46" is stored in the I/O setting area 205 of RAM 52 in FIG. 4. As shown in FIG. 5, this code means that an input unit is the image scanner 2 and that an output unit is the unit 4 required for the communication via facsimile.

At step S102, the set values stored in the scanner setting area 203 and the set values stored in the facsimile setting area 202 in relation to the line density are transferred to the CCD read control portion 54 and the mechanism and the record control portion 67, respectively, in a manner similar to the copy mode.

At step S103, the data format for transfer (compression code) stored in the facsimile setting area 202 of RAM 52 is transferred to the image data codec control portion 69. Then, at step S104, each of the set values stored in the area 202 of FIG. 4 is transferred to the facsimile transmission control portion 70.

In this way, the line density is set for 4 lines/mm or 8 lines/mm and the image reading is carried out with a resolution based on the line density selected.

The image data codec control portion 69 is caused to convert binary image data into run length codes when the data format for transfer has been set for the modified Huffman codes. The facsimile transmission control portion 70 can control the outputting of the image data into the line 4a in accordance with the data transmission procedure based on the CCITT standard.

At step S105, operating instructions are given to the respective control portions, whereby at step S106 the subroutine of "data transfer between units" (See FIG. 8d) on the data bus DB is carried out. In this case, the data transfer subroutine is repeated twice. First, image data for one line is transferred on the data bus DB from the CCD read control portion 54 (a first input unit) to the image data codec control portion 69 (a first output unit), where the image data is encoded by the modified Huffman encoding method. Second, the modified Huffman encoded data is transferred on the data bus DB from the image data codec control portion 69 (the first output unit and a second input unit) to the facsimile transmission control portion 70 (a second output unit). Accordingly, the image data (binary data) read by the image scanner 2 is stored in the line memory 55 and then the data is transferred to the facsimile transmission control portion 70 byte by byte. The above data transfer operation is carried out by repeating steps S105 to S110 for every line.

At steps S108, S109, and S110, discrimination for the data reception from the host 8, the depression of a key, and the task finish of the CCD read control portion 54 and of the facsimile transmission control portion 70 are carried out, respectively. When the data reception from the host 8 is detected at step S108, the program proceeds to step S200 of FIG. 9. When it is determined at step S109 that some key has been operated, the program returns to ① of FIG. 7 for identifying the key.

When the transmission of a sheet of document is completed, the processing in a call mode is carried out by the facsimile transmission control portion 70 because the CALL status is ON. As soon as the phone call is finished, the facsimile transmission control portion 70 outputs a discrimination code for the task end, by which the code confirms the end of the task.

The CALL status is turned off at step S114, the REMOTE status is turned on at step S115, and the COMPLETION status is turned on at step S116, whereby the data transmission process is completed. Then, the program returns to step S7 of FIG. 6.

Next, when the RECEIVE key is operated, (1-11) of FIG. 8e is carried out as follows:

If the FAX flag is determined to be OFF at step S120 or if the PAPER REQUEST status is determined to be ON at step S121, the program returns to step S7 of FIG. 6 for prohibiting the acceptance of this key input. In addition, if the circuit is not connected, this routine is not carried out in the data transmission.

When the conditions are satisfactory, the I/O setting code "44" is stored in the I/O setting area 205 of RAM 52 at step S122. With this code, the facsimile 4 is set as an input device and the image printer 3 as an output device. Then, at step S123, set values stored in the printer setting area 204 of RAM 52 are transferred to the mechanism and the record control portion 67. Afterwards, the program proceeds to step S103 of the data transmission routine (1-10) of FIG. 8e. From this step on, the data reception routine is carried out according to the data transmission routine except for step S106. Therefore, the description for those steps is omitted here.

In the data transfer process between units carried out at step S106 (See FIG. 8d), which is repeated twice in the data transmission process, modified Huffman encoded data received from the facsimile transmission control portion 70 (a first input unit) through the telephone line 4a is transferred to the image data codec control portion 69 (a first output unit), by which the modified Huffman codes are decoded into binary data. The decoded data in the binary form is transferred from the image data codec control portion 69 (a second input unit) to the mechanism and the record control portion 67 (a second output unit). This two-step data transfer portion is carried out for every line by repeating the steps S105 to S110.

If paper shortage is detected during the data reception process at step S107, the program proceeds to step S111 where it is determined whether or not the device is in a transmission mode. When the device is not in a transmission mode, the program proceeds to step S112, where an error discrimination code is supplied to the facsimile transmission portion 70 for error processing and at the same time, the ERROR status is turned on (the lamp 27 on the operating panel 6 shown in FIG. 2 is turned on). After that, the PAPER REQUEST status is turned on at step S113, and then the program proceeds to step S114 to end this data reception process.

As described above, different types of processing are carried out by operating the keys on the operating panel 6 as shown in FIG. 2, independent of the host 8.

B. THE REMOTE (ON-LINE) CONTROL

Additional kinds of processing are also carried out by the device 1 according to the following demands outputted from the host 8 in the waiting state of steps S7, S9 and S10 of FIG. 6.

(1) STATUS REQUEST command

This is a command for confirming an actual status of the device 1 in the case of controlling the device 1 due to a predetermined program for the host 8. The device 1 is adapted to respond to this command even while the device is performing some task.

Figure 9:
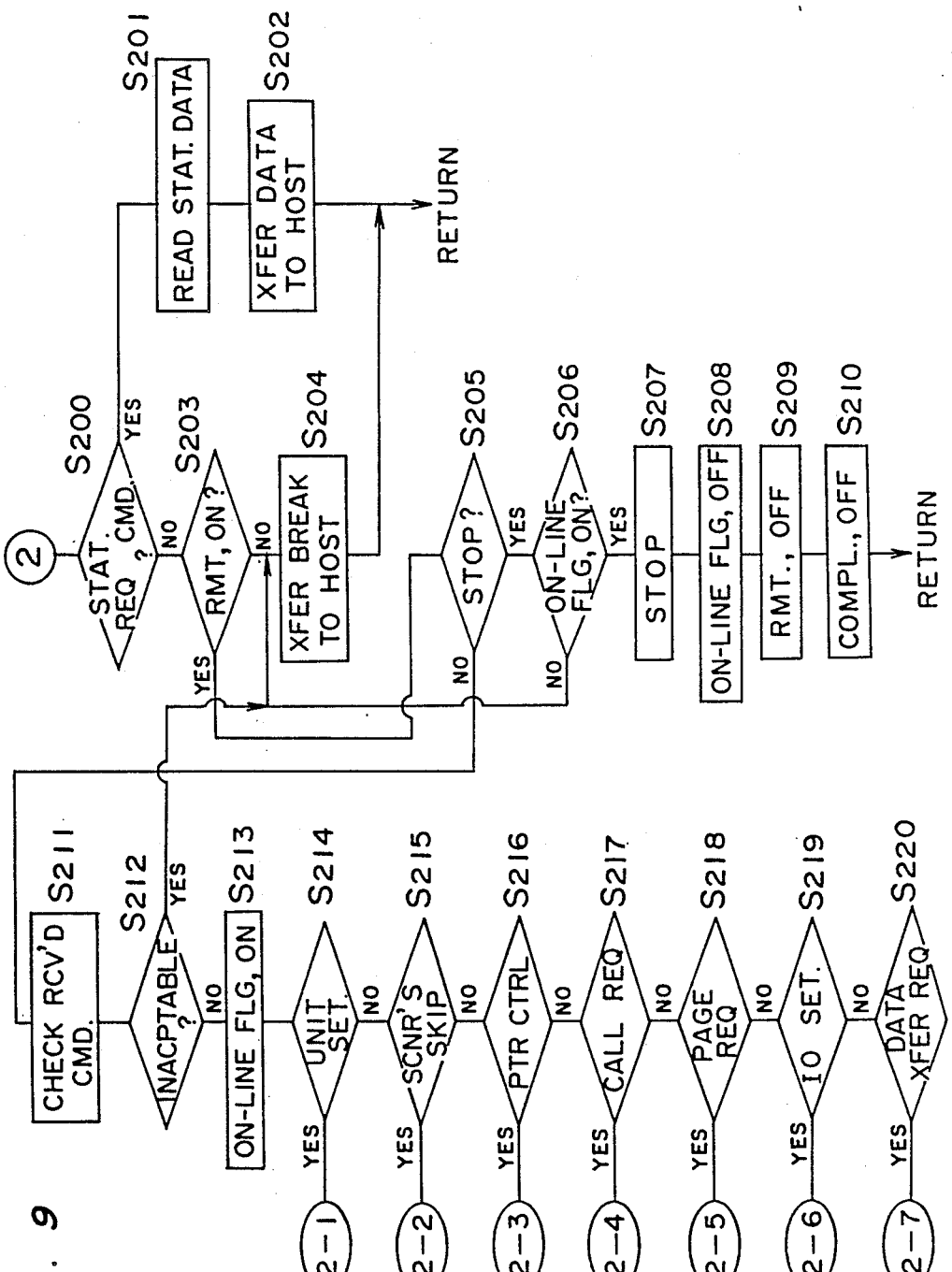
FIGS. 9 through FIG. 10d are flow charts for processes carried out in the on-line control status of the device.

When the device 1 receives this command from the host 8 at step S10 of FIG. 6, step S29 in (1-2) of FIG. 8a, step S56 in (1-8) of FIG. 8c, step S108 in (1-10) of FIG. 8e, step S234 in (2-2) (described later) of FIG. 10a, or step S243 in (2-3) (described later) of FIG. 10b, the program proceeds to step S200 of FIG. 9.

At step S200, it is determined whether or not the received command is a STATUS REQUEST command. When the received command is a STATUS REQUEST command, the program proceeds to step S201. When the received command is not a STATUS REQUEST command the Program proceeds to step S203. At step S201, data stored in the area 100 for status setting of RAM 52 is read out. Then, at step S202, the read data of one byte in relation to the status of the device 1 is transferred to the host 8 through the parallel interface 5. Thereafter, the program returns to step S7 for repeating steps S7, S9 and S10 and waits for the next key depression or the next command from the host 8.

At step S203, it is determined whether or not the REMOTE status is ON. When the REMOTE status is OFF, the program proceeds to step S204, where data "BREAK" is transferred to the host 8 through the parallel interface 5. Then, the program returns to step S7 and waits for a further key operation or command from the host 8. On receiving BREAK, the host 8 confirms that it has transferred a wrong command to the device 1. On the other hand, when it is determined at step S203 that the REMOTE status is ON, the program skips to step S205.

(2) STOP command

When the program proceeds to step S205 and passes through steps S200 and S203, it is determined whether or not the command transferred from the host 8 is a STOP command. If the transferred command is a STOP command the program proceeds to step S206, where it is determined whether or not the ON-LINE flag is in an ON-state. If the ON-LINE flag is in an OFF-state, that is, the device 1 is not operating under the control of the host 8, the program returns to step S204, where the data "BREAK" is outputted to the host 8 because STOP command is not a proper command.

On the other hand, when the ON-LINE flag is judged to be in an ON-state at step S206, the device 1 stoPs the operation actually being carried out at step S207. This corresponds to the operation of the STOP key in the OFF-LINE control. Subsequent to the operation stop, the ON-LINE flag is turned off at step S208, the REMOTE status is turned off at step S209, the COMPLETION status is turned on at step S210, and then the program returns to step S7 and waits for the next key operation or command from the host 8.

When the received command is determined not to be a STOP command at step S205, the program proceeds to step S211, where the received command is checked. At step S212, it is determined if the received command is acceptable with respect to the data format, the command transfer procedure, etc. When the received command is unacceptable because the command has not been transferred prior to corresponding data transfer, for example, the program goes to step S204 to transfer the data "BREAK" to the host 8 and returns to step S7 of FIG. 6. When the received command is judged to be acceptable at step S212, the ON-LINE flag is turned on at step S213 so that control may be carried out in accordance with the command.

The command transfer process is determined in advance, that is, prior to data transfer from the host 8 to the device 1, a UNIT SETTING command, which is described in detail later, is transferred to RAM 52 together with the initial setting data for each of the functions or set values to be stored in the respective areas 201 to 204 of RAM 52. Afterwards, an I/O SETTING command for specifying the input and output units is transferred to RAM 52 together with one of the preset unit setting codes of one byte (See FIG. 5).

In the data transfer between the device 1 and the host 8, the host 8 transfers a DATA TRANSFER command to the device 1. The device 1 transfers data "ACK" (acknowledge) or "NAK" (negative acknowledge) to the host 8 in reply to the command. The host 8 prepares for transferring the next command in accordance with the reply.

The following commands are those which are to be received by the device 1 during the waiting state (although STATUS REQUEST and STOP commands will be omitted in the following description).

(3) UNIT SETTING command

This command is for effecting the initial setting for the respective functions of the device 1 and consists of a device designating code of one byte for distinguishing the facsimile, scanner and printer from each other. This command is accompanied by the set values for a plurality of bytes to be stored in the respective areas 201 to 204 of RAM 52. When the UNIT SETTING command is received, the program advances to step S214 via steps S200, S203, S205, S211, S212 and S213. If the received command is determined to be UNIT SETTING at step S214, (2-1) of FIG. 10a is carried out. If the received command is not the UNIT SETTING command, the program proceeds to step S215.

Referring to (2-1), at step S230, the set values are written into the corresponding area 201, 202, 203 or 204 of RAM 52 in response to the transferred device code. Then, at step S231, the device 1 forwards the data "ACK" to the host 8 through the parallel interface 5 and the program returns to step S7 of FIG. 6.

Receiving the data "ACK", the host 8 starts preparing for the next command transfer. The host 8 outputs the UNIT SETTING command repeatedly when additionally devices are required to be set.

(4) SCANNER'S SKIP command

This command is for shifting the CCD sensor 58 in the image reading process so that the CCD sensor may skip a document having a range unnecessary for reading. A value representing the shift or skip quantity, which consists of a plurality of bytes, follows the SCANNER'S SKIP command of one byte.

Figure 10A:
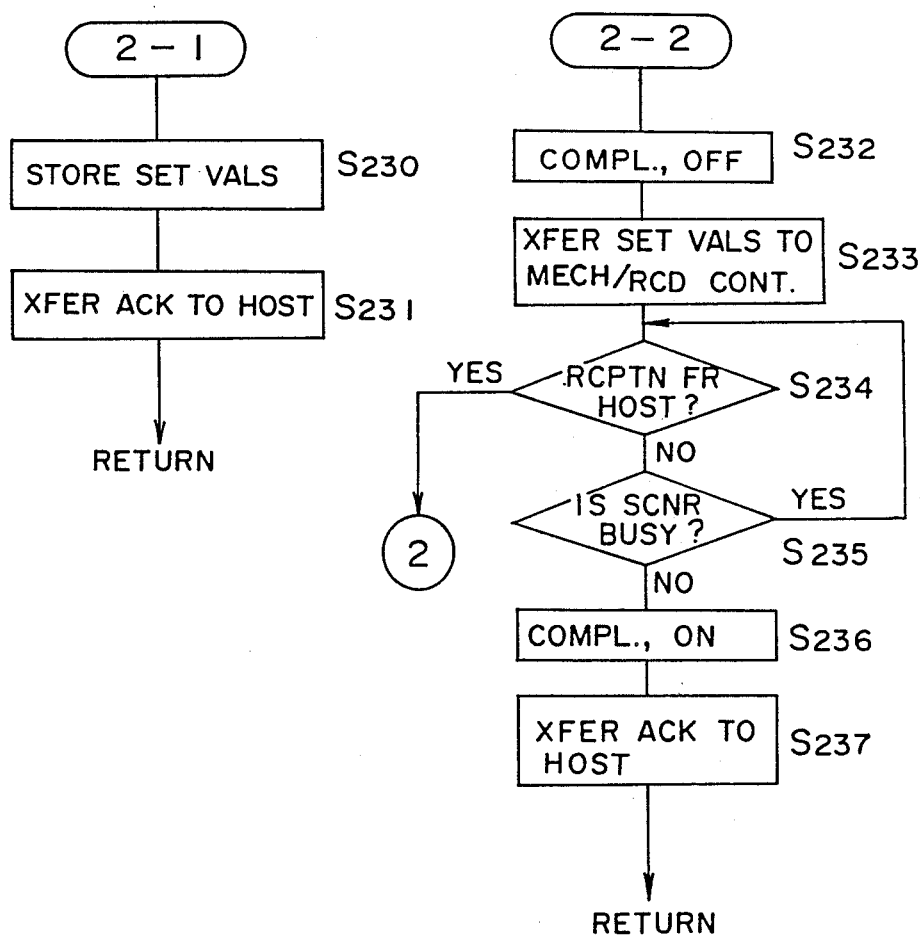

When it is determined at step S215 that the received command is SCANNER'S SKIP, the program branches to (2-2) of FIG. 10a. If the received command is not SCANNER'S SKIP, the program proceeds to step S216.

Referring to (2-2), first, the COMPLETION status is turned off at step S232, and then the set value for scanner's skip quantity is supplied to the mechanism and the record control portion 67 so that the CCD sensor 58 may be shifted. The mechanism and the record control portion 67 drive the motor 59 according to the scanner's skip quantity. As soon as the scanner's shift is completed, a signal representing the scanner being busy is turned off and then a signal representing the completion of the operation is outputted from the mechanism and the record control portion 67.

Meanwhile, the program proceeds to step S234, where it is determined whether or not some command from the host 8 is received. When commands are received from the host 8, the program proceeds to the above-mentioned step S200. Furthermore, at step S235 it is determined whether the "scanner's being busy" signal is in an ON-state or not. When the signal is in an ON-state the program returns to step S234 for repeating steps S234 and S235 and waits for a further command from the host 8.

When there is neither data reception from the host 8 nor the "scanner's being busy" signal in an IN-state, the program proceeds to step S236, where the COMPLETION status is turned off. Subsequently the data "ACK" is transferred to the host 8 at step S237 and then the program returns to step S7 of FIG. 6.

After receiving the data "ACK", the host 8 starts preparing for the next command transfer.

(5) I/O SETTING command

This command is for specifying input and output units, consisting of one byte. Subsequent to the command, the host 8 outputs one of the predetermined I/O setting codes showing in FIG. 5 to RAM 52 according to a given program for the host 8. The code is put into the I/O setting area 205 of RAM 52.

The following description is for the operation of the device 1 in response to each of the above mentioned commands (UNIT SETTING, SCANNER'S SKIP, PRINTER CONTROL, CALL REQUEST, PAGE REQUEST, I/O SETTING and DATA TRANSFER REQUEST). Each time any one of those commands outputted from the host 8 is received during the waiting state of steps S7, S9 and S10 of FIG. 6, the program proceeds to (2-1), (2-2), (2-3), (2-4), (2-5), (2-6), or (2-7) via steps S200, S203, S205, S211, S212, and S213 of FIG. 9, so that the device 1 accomplishes the following functions by the respective programs.

(i) Reading image data by the image scanner 2 and transferring the data to the host 8.

Prior to carrying out this operation, the host 8 transfers the UNIT SETTING command to the device 1 for storing set values of the scanner in the corresponding area of RAM 52.

The host 8 outputs the setting code "45" together with the I/O SETTING command to the device 1. By this code "45", the image scanner 2 is determined to be an input unit and the host 8 is determined to be an output unit, as shown in FIG. 5. The program carries out a routine (2-6) of FIG. 10c due to the I/O SETTING command.

At step S269, it is determined whether the COMPLETION flag is in an ON-state or not. When the flag is in an ON-state, the program proceeds to step S270. When the flag is OFF (this means that the image scanner is in operation), the program proceeds to step S279, where the device 1 transfers the data "NAK" to the host 8 for indicating that the image scanner 2 is not ready yet.

At step S270, the I/O setting code "45" is stored in the corresponding area 205 of RAM 52. Thereafter, at step S271 the set values stored in the area 203 of RAM 52 are transferred to the corresponding control portions in accordance with the code "45". Also, the set values stored in the scanner setting area 203 of RAM 52 are supplied to the CCD read control portion 54 and to the mechanism and the record control portion 67. In the case that the value, stored in the device setting area 201 of RAM 52, in relation to the data format for data transfer represents modified Huffman compression codes, instructions for converting data into modified Huffman codes are given to the image data codec control portion 69.

At step S272, it is determined whether or not the image printer 3 is selected as an output unit. When the I/O setting code designates the host 8 as an output unit in this case, the image printer is determined not to be selected as an output unit. Then, the program skips to step S274, where it is determined whether the facsimile 4 is selected as an output unit. Here again, by the same reason, the program skips to step S276, where the device 1 provides the host 8 with the data "ACK". The program returns to step S7 of FIG. 6.

The data "ACK" confirms to the host 8 that the unit setting has been completed. Therefore, the host 8 starts preparing for receiving data from the device 1. When the host 8 is ready, the host 8 outputs the DATA TRANSFER REQUEST command to the device 1. On receiving the command, the device 1 carries out a routine (2-7) of FIG. 10d.

At step S280 it is determined whether or not a "BUSY" signal indicating that an input unit or an output unit designated by the I/O setting code in operation is in an ON-state. In this case, the "BUSY" signal outputted from the CCD read control portion 54 is checked for determining whether the image scanner 2 is in operation or not. When the signal is determined to be in an ON-stated, the program proceeds to step S279 where the "NAK" data is transferred to the host 8, and the program returns to step S7 of FIG. 6.

After receiving the data "NAK", the host 8 outputs the DATA TRANSFER REQUEST command to the device 1 repeatedly until the image scanner 2 gets ready for outputting data to the host 8. Then, the program proceeds to step S281.

At step S281, operating instructions are given to the designated units according to the I/O setting code stored in the are a 205 of RAM 52. That is, the CCD read control portion 54, the mechanism and the record control portion 67 receive the operating instructions and control the image scanner 2 to read a document line by line in a similar manner to the copy mode (See FIG. 8c). The read data for one line is stored in the line memory 55.

If completion of the image reading is confirmed as a result of the determination at step S282, the program proceeds to step S283, where the device 1 outputs the data "ACK" to the host 8. If the image reading is not completed yet, step S282 is repeated until the completion is confirmed. At step S284, it is determined whether or not the device 1 is required to receive data from the host 8. Because the device 1 is supposed to transfer data read by the image scanner 2 to the host 8 in this case, the program proceeds to step S285.

At step S285, the data transfer between control portions is carried out based on the subroutine shown in FIG. 8d. In this example, the CCD read control portion 54 provides the parallel interface 5 with obtained image data since the host 8 is designated as an output unit. In transferring line data to the host 8, if the device setting area 201 of RAM 52 sets the data transfer format to the modified Huffman codes, the CCD read control portion 54 forwards the image data of one line to the image data codec control portion 69 where the data is encoded by the modified Huffman compression encoding method. The modified Huffman compression codes obtained are finally transferred to the host 8.

Generally speaking, modified Huffman compression data is of a shorter bit length than binary data, so that the host 8 selects the modified Huffman compression encoding in the case of filing data in a floppy disk or in a similar case, though this compressed data is decoded into binary data again when displayed on the CRT displayed unit, etc.

At step S287, it is determined whether or not the image printer 3 is designated as an output unit. As the printer 3 is not designated as an output unit in this case, the program returns to step S7 of FIG. 6 and waits for another DATA TRANSFER REQUEST command. When the device 1 receives this command, image data of the next line is read. This process is repeated until reading of the image data for every line is completed.

When data of a predetermined quantity has been read, the host 8 outputs the STOP command for stopping the on-line control.

As understood from the above description, the control by the host 8 enables the device 1 to read image data at the portion of the image scanner 2 and provides the data to the host 8, so that the host 8 can output the incoming data on the CRT display unit or file the data in a floppy disk by the floppy disk device, etc.

(ii) Recording image data generated in the host 8 by the image printer 3.

In recording image data generates in the host 8 as a result of executing a program for the host 8 or image data filed in the floppy disk, the host 8 forwards the I/O setting code "42" together with the I/O SETTING command to the device 1. This code assigns the host 8 to the input unit and the image printer 3 to the output unit. The routine (2-6) of FIG. 10c is also carried out in this case. The following description is for steps different from the above case.

At step 270, the I/O setting code "42" is stored in the corresponding area 205 of RAM 52. Then, at step S271, set values stored in advance in the printer setting area 204 and the device setting area 201 of RAM 52 are read out and the set values for the printer 3 are supplied to the mechanism and the record control portion 67. When values on the data transfer format in the area 201 of RAM 52 are set for the modified Huffman codes, instructions for decoding incoming data are given to the image data codec control portion 69.

In the determination for the output unit setting at step S272, an output unit is set because the I/O setting code designates the image printer 3 as an output unit in this case. Therefore, the program proceeds to step S273 where it is determined whether the PAPER REQUEST status is ON or not. If the PAPER REQUEST status is ON, the program proceeds to step S277, where the ON-LINE flag is turned off and then, at step S278, the data "BREAK" is transferred to the host 8. The program returns to step S7 of FIG. 6 at this point.

When the PAPER REQUEST status is determined to be OFF at step S273, the program proceeds to step S276 via step S274. The device 1 forwards the data "ACK" to the host 8 at step S276 and then the program returns to step S7 of FIG. 6 in order to wait for further commands.

Figure 10B:
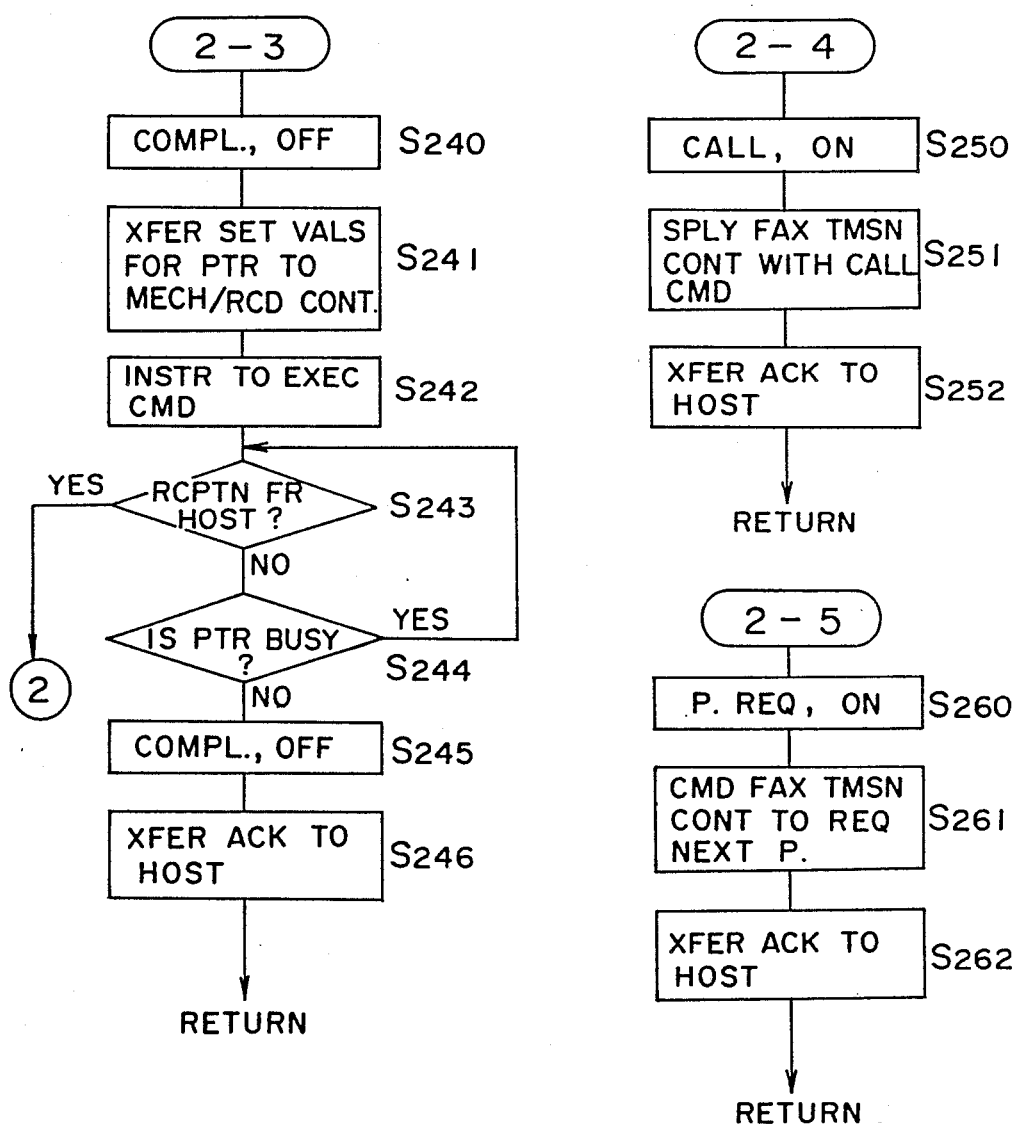
Figure 10C:
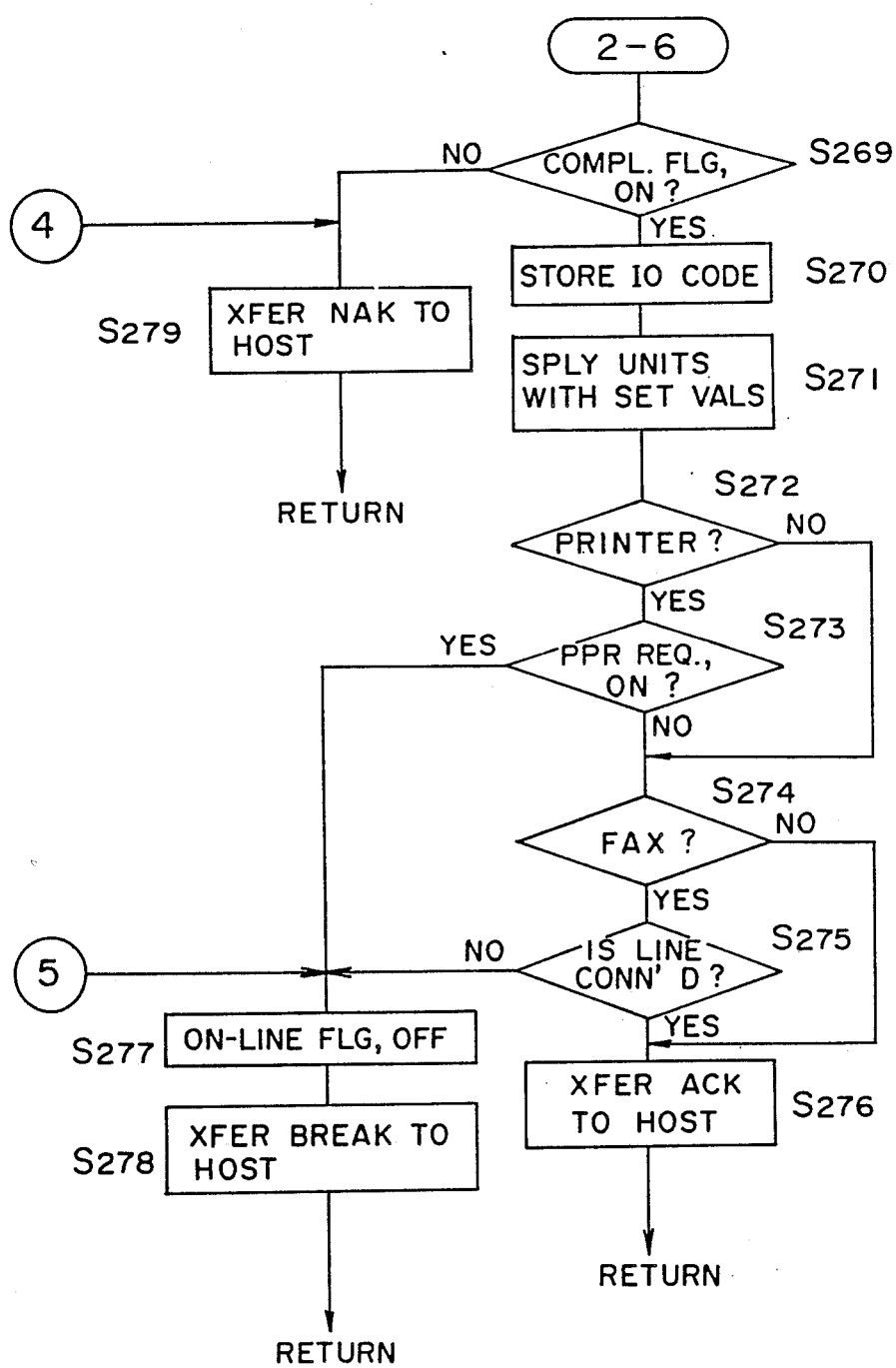
Figure 10D:
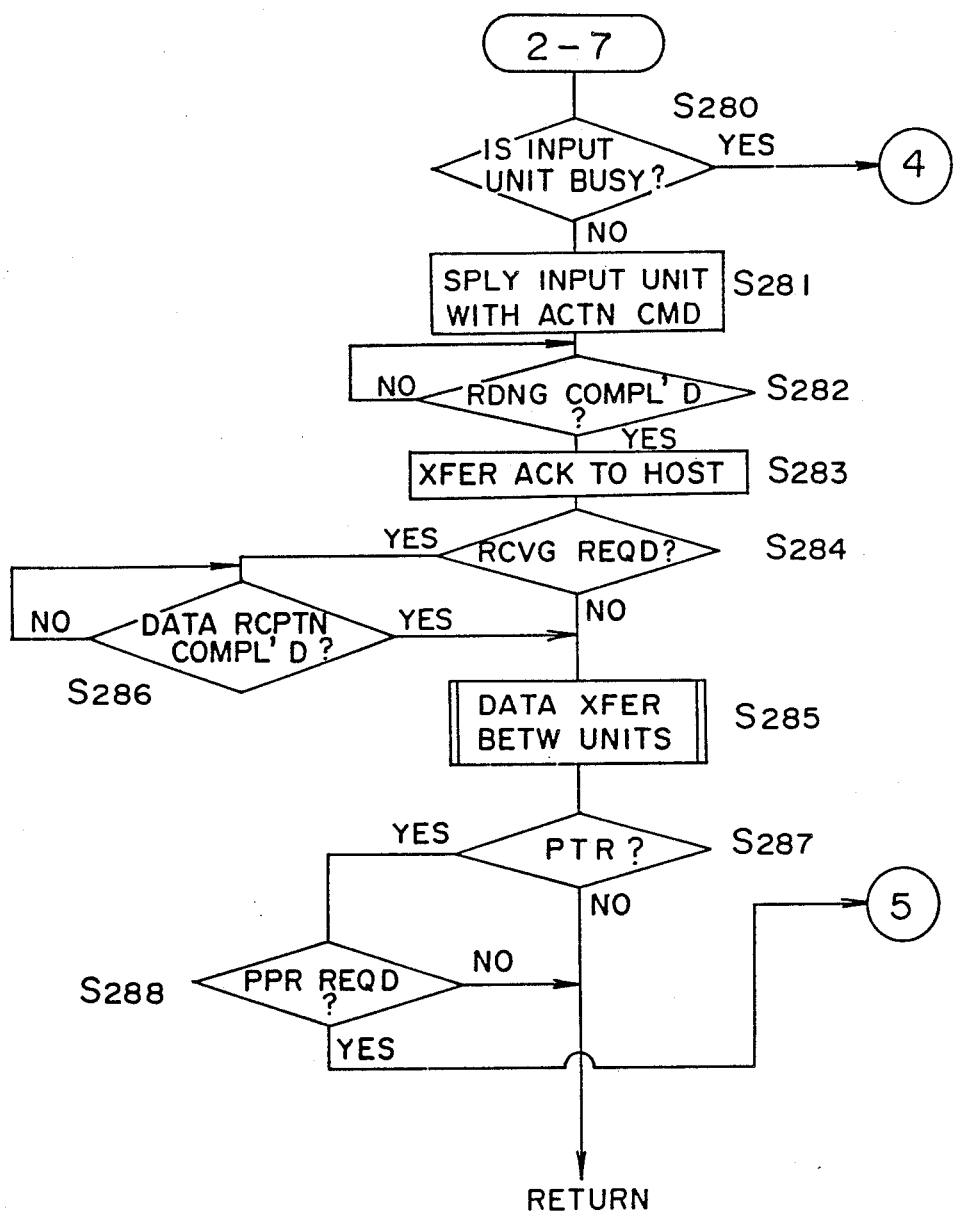

When the further command is a DATA TRANSFER REQUEST command, (2-7) of FIG. 10d is carried out similar to the foregoing description. The description of steps similar to the steps for the above procedure will be omitted.

At step S284, it is determined whether or not the host 8 requires the device 1 to receive data from the host 8. Because the input unit for this case is the host 8, it is determined that the device 1 is required to receive data from the host 8. Then, the host 8 starts forwarding a line data to the device 1. When it is determined at step S286 that the data reception is completed, the program advances to step S285 where the data corresponding to each line is transferred to the record control section of the mechanism and the record control portion 67 together with the DATA TRANSFER command according to the subroutine of "data transfer between units" as showing in FIG. 8d.

At step 287, it is determined that the printer 3 is designated as an output unit, and so, the program proceeds to step S288 where a determination of a paper shortage or a paper request is carried out. When paper has run short, the program proceeds to step S277 of FIG. 10c, where the ON-LINE flag is turned off, and subsequently the data "BREAK" is forwarded to the host 8. Then, the program returns to step S7 of FIG. 6. On the other hand, when paper is not needed to be supplied at step S288 of FIG. 10d, the program immediately returns to step S7 so that the device 1 may be brought into a waiting state.

If the device 1 receives the PRINTER CONTROL command from the host 8 while steps S7, S9 and S10 are repeated in turn, (2-3) of FIG. 10b is carried out. As soon as the PRINTER CONTROL command (e.g. line feed command) is received, the COMPLETION status is turned off at step S240. At step S241, set values stored in advance in the printer setting area 204 of RAM 52 (See FIG. 4) are read out and transferred to the mechanism and the record control portion 67. Then, at step S242, the mechanism and the record control portion 67 are given instructions for carrying out the command. Therefore, the mechanism and the record control portion 67 carry out the command according to the transferred set values.

At step S243 it is determined whether or not the device 1 has received some other commands from the host 8. When a command is outputted from the host 8, the program returns to step S200. Without any other command, the program proceeds to step S244 where it is determined whether or not there is a signal, which represents that the image printer 3 is in some operation, such as an ON-state. With the signal in an ON-state, the program returns to S243 and steps S243 and S244 are repeated in turn until the signal is turned off, that is, the image printer gets ready. When the "BUSY" signal is in an OFF-state, the program returns to step S7 of FIG. 6 via steps S245 and S246 where the COMPLETION status is turned off and then the data "ACK" is forwarded to the host 8.

When the printer 3 runs short of paper during the printing operation, the device 1 transfers the data "BREAK" to the host 8 at step S278 as described before.

When the printing operation finishes, the host 8 outputs the STOP command to stop the control.

(iii) Data communication via facsimile of image data produced in the host 8.

In transmitting image data produced by the host 8 or by image data stored in the floppy disk via facsimile using the telephone line 4a connected to the device 1, the host 8 outputs the I/O setting code "41" to the device 1. This code assigns the host 8 as the input unit and the facsimile 4 as the output unit. In this case, the routines (2-6) and (2-7) of FIG. 14 are carried out as follows (although steps for processes similar to foregoing processes are omitted):

In starting (2-6), the circuit is connected for data transmission by manual dialing or automatic dialing under the control of the host 8.

At step S274, it is determined whether or not the facsimile 4 is designated as an output unit. As a result of the determination, the program proceeds to step S275, where it is determined by checking the signal outputted by the facsimile transmission control portion 70 whether or not the circuit is connected. When the circuit is not connected, the program proceeds to step S277, where the ON-LINE flag is turned off. Then, the device 1 forwards the data "BREAK" to the host 8, and the program returns to step S7 of FIG. 6. On the other hand, when the circuit is connected, the data "ACK" is transferred to the host 8. Then, the program returns to step S7 of FIG. 6 for repeating steps S7, S9 and S10 and waits for the next command from the host 8.

When the device 1 receives the CALL REQUEST command in the waiting state, the program carries out (2-4) of FIG. 10b. First, at step 250, the CALL status in the area 100 of RAM 52 is turned on. And then, at step S251, instructions for a call are given to the facsimile transmission control portion 70. Further processing is done similar to the facsimile transmitting operation under the local (off-line) control.

In the case that data corresponding to a plurality of sheets or pages of paper is transmitted, the host 8 forwards the PAGE REQUEST command to the device 1. Whereby, the program carries out (2-5) of FIG. 10b as follows:

At step S260, the PAGE REQUEST status in the area 100 of RAM 52 is turned on due to the PAGE REQUEST command. At step S261, instructions for the next page of data are given to the facsimile transmission control portion 70. At step S262, the device 1 transfers the data "ACK" to the host 8, whereby the transfer of data of the next page is carried out in conformity with the CCITT standard.

(iv) Transferring image data received via facsimile to the host 8.

After confirming that the circuit is connected (not shown in the flow chart), the host 8 outputs the I/O setting code "43" together with the I/O SETTING command. This code means that the facsimile 4 and the host 8 are input and output units, respectively (See FIG. 5). On receiving the I/O SETTING command, the program carries out (2-6) and then (2-7).

The data transfer from the device 1 to the host 8 is started by receiving the DATA TRANSFER command. The data format for the transfer to the host 8 is determined by the data stored in the device setting area 201 of RAM 52.

(v) Converting image data generated or filed in the host 8 into binary data or modified Huffman codes.

This task is carried out when the I/O setting code "40" is transferred from the host 8. Set values indicative of the I/O data format stored in the area 201, that is, MH/MR codes or binary data, are read out and supplied to the image data codec control portion 69, whereby encoding or decoding is effected. Binary data or modified Huffman codes obtained through the conversion processing are sent back to the host 8.

(2-7) of FIG. 10d is used for this data conversion. In this data conversion, the DATA RECEPTION REQUEST command and the DATA TRANSFER REQUEST are outputted alternately. For example, first, the host 8 transfers the DATA RECEPTION REQUEST command to the device 1 for transferring line data encoded by the modified Huffman encoding method to the image data codec control portion 69, which decodes the incoming modified Huffman codes into binary data and stores the binary data in the work area 300 of RAM 52 temporarily. Next, the host 8 transfers the DATA TRANSFER REQUEST command to the device 1 so that the device 1 transfers the binary data corresponding to one line of a document back to the host 8. The above sequence is repeated for every line.

The line memory 55 may be used for temporary storage of data as an alternative to the work area 300 of RAM 52.

As described above, various controls are realized according to the I/O setting codes shown in FIG. 5 in the on-line control state and off-line control state.

As obvious from the above description, a multifunctional data processing device according to the invention can copy or transmit documents via facsimile selectively independent of the control of the external data processing unit.

Meanwhile, under the control of the host 8, that is, in the on-line state, data transfer between units such as the image read control unit, facsimile transmission control unit, image record control unit and the external data processing unit connected to the interface can be effected through the intermediary of the data bus according to each control command outputted from the external data processing unit. Whereby, the device of the present invention realizes further functions such as outputting image data read by the image read control unit to the external data processing unit, recording data transferred from the external data processing unit by the image record control unit, transmitting data received from the external data processing unit via facsimile or transferring data received via facsimile to the external data processing unit by the facsimile transmission control unit, and so on.

In summary, various kinds of image processing and image editing are easily realized in a single compact device by connecting the device to the external data processing unit.

Although the present invention has been fully described by way of example with reference to the accompanying drawings, it is to be noted where that various changes and modifications will be apparent to those skilled in the art. Therefore, unless otherwise such changes and modifications depart from the scope of the present invention, they should be construed as being included therein.

What is claimed is:

1. A multifunctional image processing device for processing image data in response to control information developed from main control means and control commands developed from external data processing means:

a housing including, image read control means for reading an image and developing the image data in response to the control information and the control commands, facsimile control means for sending and receiving the image data through a telephone line in response to the control information and the control commands, image record control means for recording the image data in response to the control information and the control commands, interface means connected to the external data processing means capable of synthesizing and editing the image data for transferring the control commands and the image data between the external data processing means and the image processing device, and bus lines for connecting said image read control means, said facsimile control means, said image record control means and said interface means;

the main control means being connected to said bus lines for controlling the control information and the control commands, the control information being developed and the control commands being prevented from transferring to said interface means when the image processing device is in a first state and the control commands being transferred to said interface means and the control information being prevented from developing when the image processing device is in a second state;

wherein the image data is reciprocated between the external data processing means and the image processing device in response to the external data processing means for synthesizing and editing the image data.

2. An image processing device as claimed in claim 1, further comprising memory means having a plurality of areas for storing operating conditions for said image read control means, said facsimile control means, said image record control means, said interface means, and the main control means.

3. An image processing device as claimed in claim 2, wherein said memory means stores data having an I/O combination in the form of a code for operating at least two of said image read control means, said facsimile control means, said image record control means, said interface means, and the main control means.

4. A multifunctional image processing device for processing image data comprising:

image read control means for reading an image and developing the image data;

facsimile control means for sending and receiving the image data through a telephone line;

image record control means for recording the image data;

main control means being connected to said image read control means, said facsimile control means and said image record control means for developing control information and controlling said image read control means, said facsimile control means and said image record control means; and external data processing means being connected to said image read control means, said facsimile control means and said image record control means by interface means for developing control commands and controlling said image read control means, said facsimile control means and said image record control means;

the image data being reciprocated between said external data processing means and the image processing device in response to said external data processing means by developing said control commands and preventing said control information from being developed when the image processing device is in a first state and said control information being developed by said main control means which prevents said control commands from being developed when the image processing device is in a second state.

5. An image processing means as claimed in claim 4, wherein a housing comprises said image read control means, said facsimile control means, said image record control means, and said main control means.

* * * * *